(12) United States Patent
Katsumata et al.

(10) Patent No.: US 11,967,153 B2
(45) Date of Patent: Apr. 23, 2024

(54) INFORMATION PROCESSING APPARATUS, REPRODUCTION PROCESSING APPARATUS, AND INFORMATION PROCESSING METHOD

(71) Applicant: SONY GROUP CORPORATION, Tokyo (JP)

(72) Inventors: Mitsuru Katsumata, Tokyo (JP); Mitsuhiro Hirabayashi, Tokyo (JP); Ryohei Takahashi, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 72 days.

(21) Appl. No.: 17/762,273

(22) PCT Filed: Aug. 28, 2020

(86) PCT No.: PCT/JP2020/032747
§ 371 (c)(1),
(2) Date: Mar. 21, 2022

(87) PCT Pub. No.: WO2021/065277
PCT Pub. Date: Apr. 8, 2021

(65) Prior Publication Data
US 2022/0406062 A1    Dec. 22, 2022

(30) Foreign Application Priority Data
Sep. 30, 2019   (JP) ................. 2019-181077

(51) Int. Cl.
*G06V 20/40* (2022.01)
*G06F 16/74* (2019.01)
(Continued)

(52) U.S. Cl.
CPC ............ *G06V 20/47* (2022.01); *G06F 16/745* (2019.01); *G10L 19/167* (2013.01);
(Continued)

(58) Field of Classification Search
CPC ......... H04N 21/44012; H04N 21/8106; H04N 21/816; H04N 21/85406; H04N 5/765;
(Continued)

(56) References Cited

U.S. PATENT DOCUMENTS 7,266,616 B1 *   9/2007  Munshi ................... G06T 15/00
                                                                    715/234
2019/0114830 A1 *   4/2019  Bouazizi ................. G06F 3/013
(Continued)

FOREIGN PATENT DOCUMENTS

JP    2013-137558 A    7/2013

OTHER PUBLICATIONS

Information technology—Coding of audio-visual objects—Part 11: Scene description and application engine, International Standard ISO/IEC 14496-11, Nov. 1, 2015, pp. i-547, 2nd edition.
(Continued)

*Primary Examiner* — Rong Le
(74) *Attorney, Agent, or Firm* — Paratus Law Group, PLLC

(57) ABSTRACT

There is provided an information processing apparatus, a reproduction processing apparatus, and an information processing method that improve data transmission efficiency. A preprocessing unit (102) generates, as scene configuration information indicating a configuration of a scene of 6DoF content including a three-dimensional object in a three-dimensional space, dynamic scene configuration information that changes over time and static scene configuration information that does not change over time, the static scene configuration information being scene configuration information different from the dynamic scene configuration information.

16 Claims, 26 Drawing Sheets

(51) Int. Cl.
    *G10L 19/16*      (2013.01)
    *H04N 21/44*      (2011.01)
    *H04N 21/81*      (2011.01)
(52) U.S. Cl.
    CPC ... *H04N 21/44012* (2013.01); *H04N 21/8106* (2013.01); *H04N 21/816* (2013.01)
(58) Field of Classification Search
    CPC .... H04N 9/8205; G10L 19/167; G06V 20/47; G06F 16/745
    See application file for complete search history.

(56) References Cited

U.S. PATENT DOCUMENTS

2020/0304834 A1* 9/2020 Wang ................... H04N 19/597
2021/0195162 A1* 6/2021 Chupeau .......... H04N 21/21805

OTHER PUBLICATIONS

Information technology—Coding of audio-visual objects—Part 12: ISO base media file format, International Standard ISO/IEC 14496-12, Feb. 20, 2015, pp. i-239, 5th edition.
Information technology—High efficiency coding and media delivery in heterogeneous environments—Part 3: 3D audio, International Standard ISO/IEC 23008-3. Feb. 2019, pp. i-798, 2nd edition.
Information technology—Dynamic adaptive streaming over HTTP (DASH)—Part 1: Media presentation description and segment formats, International Standard ISO/IEC 23009-1, Aug. 2019, pp. i-225, 3rd edition.

* cited by examiner

```
Shape {
  exposeField    SFNode    appearance    NULL
  exposeField    SFNode    geometry      NULL
}
```

307

```
BitWrapper {
  field    SFNode     node    NULL
  field    SFInt32    Type    0
  field    MFString   url     []
  field    SFString   Buffer  ""
}
```

308

```
Appearance {
  exposeField    SFNode    material            NULL
  exposeField    SFNode    texture             NULL
  exposeField    SFNode    textureTranceform   NULL
}
```

309

```
MovieTexture {
  exposeField    SFBool     loop              FALSE
  exposeField    SFFloat    speed             1.0
  exposeField    SFTime     statTime          0
  exposeField    SFTime     stopTime          0
  exposeField    MFString   url               []
  field          SFBool     repeatS           TRUE
  field          SFBool     repeatT           TRUE
  eventOut       SFTime     duration_change
  eventOut       SFBool     isActive
}
```

301

```
Group {
  eventIn        MFNode    addChildren
  eventIn        MFNode    removeChildren
  exposeField    MFNode    children          []
}
```

303

```
AudioClip {
  exposeField    SFString   description       ""
  exposeField    SFBool     loop              FALSE
  exposeField    SFFloat    pitch             1.0
  exposeField    SFTime     startTime         0
  exposeField    SFTime     stopTime          0
  exposeField    MFString   url               []
  eventOut       SFTime     duration_change
  eventOut       SFBool     isActive
}
```

305

```
Transform {
  eventIn        MFNode       addChildren
  eventIn        MFNode       removeChildren
  exposeField    SFVec3f      center              0,0,0
  exposeField    MFNode       children            []
  exposeField    SFRotation   rotation            0,0,1,0
  exposeField    SFVec3f      scale               1,1,1
  exposeField    SFRotation   scaleOrientation    0,0,1,0
  exposeField    SFVec3f      translation         0,0,1,0
}
```

FIG.6
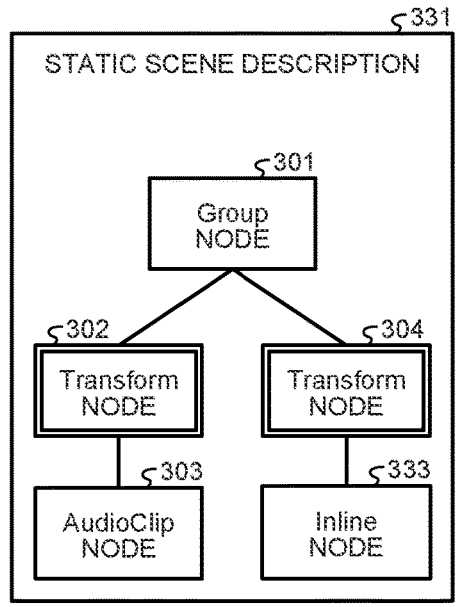
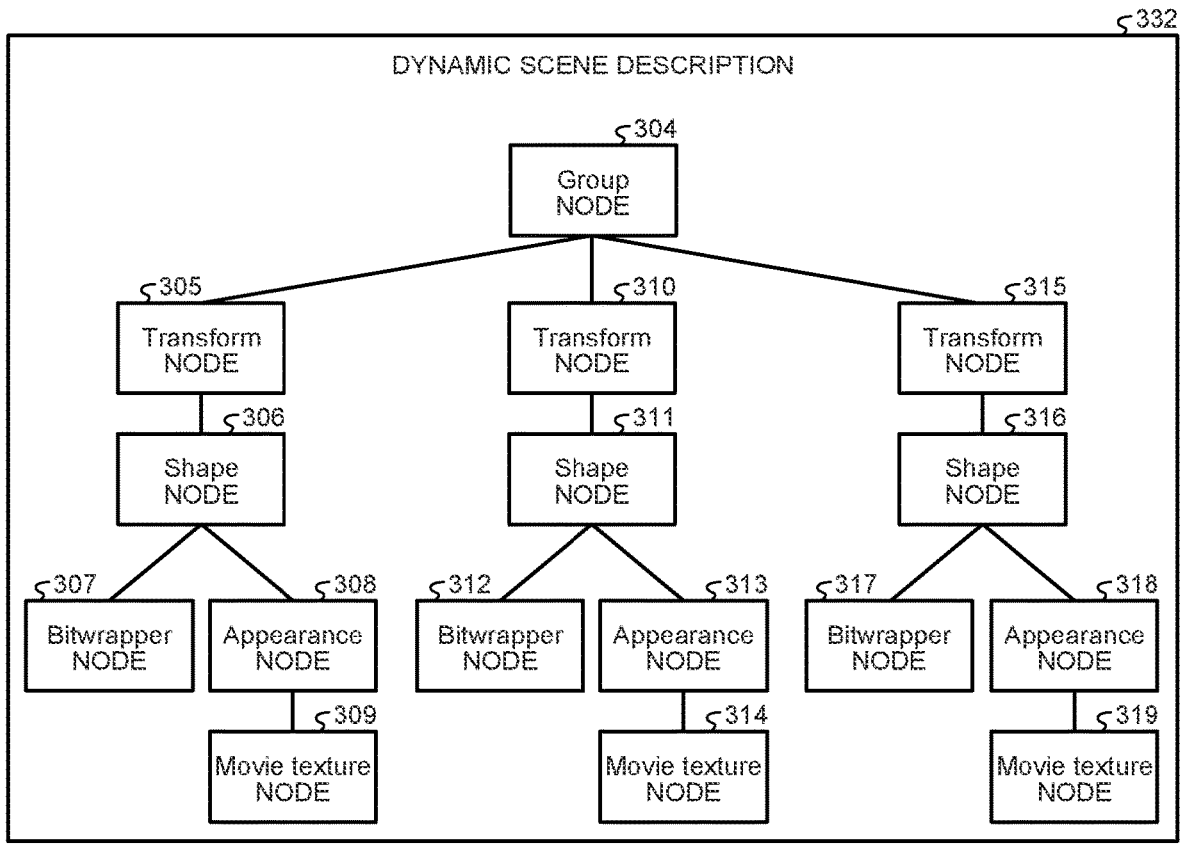

FIG.7
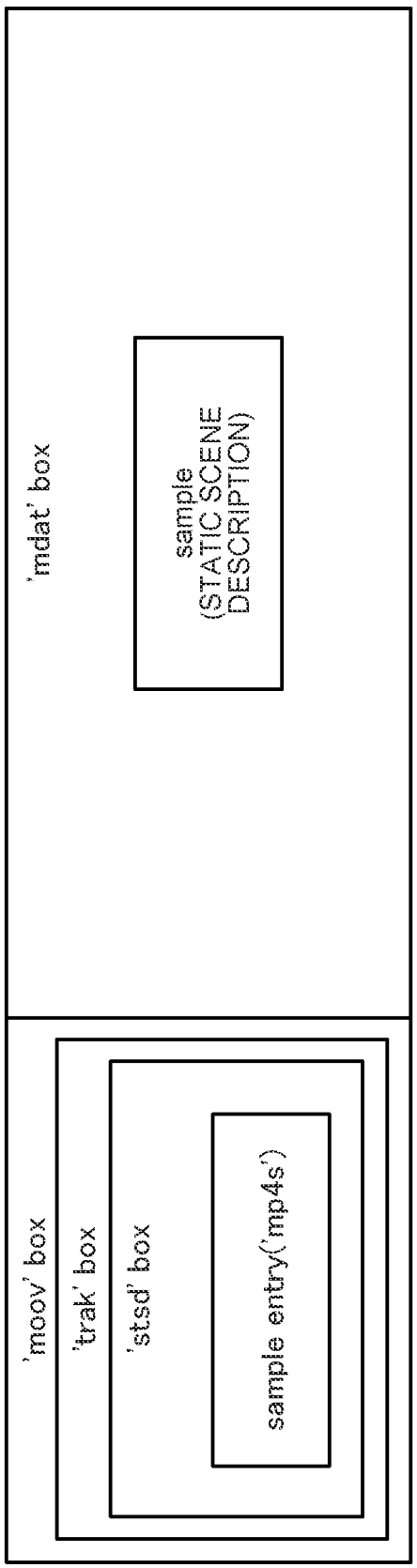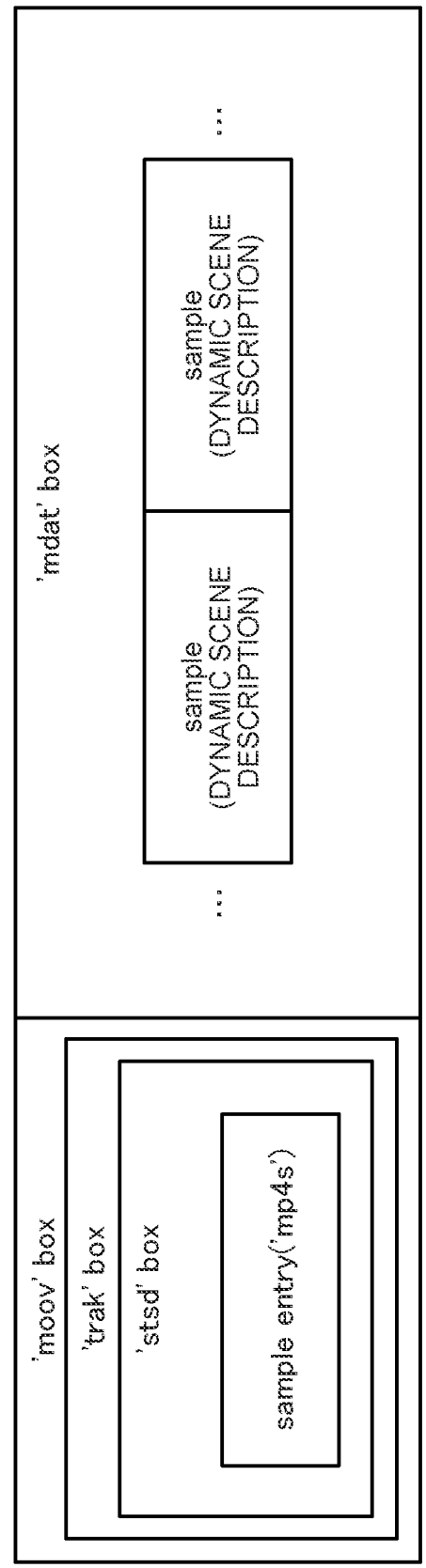

FIG.11
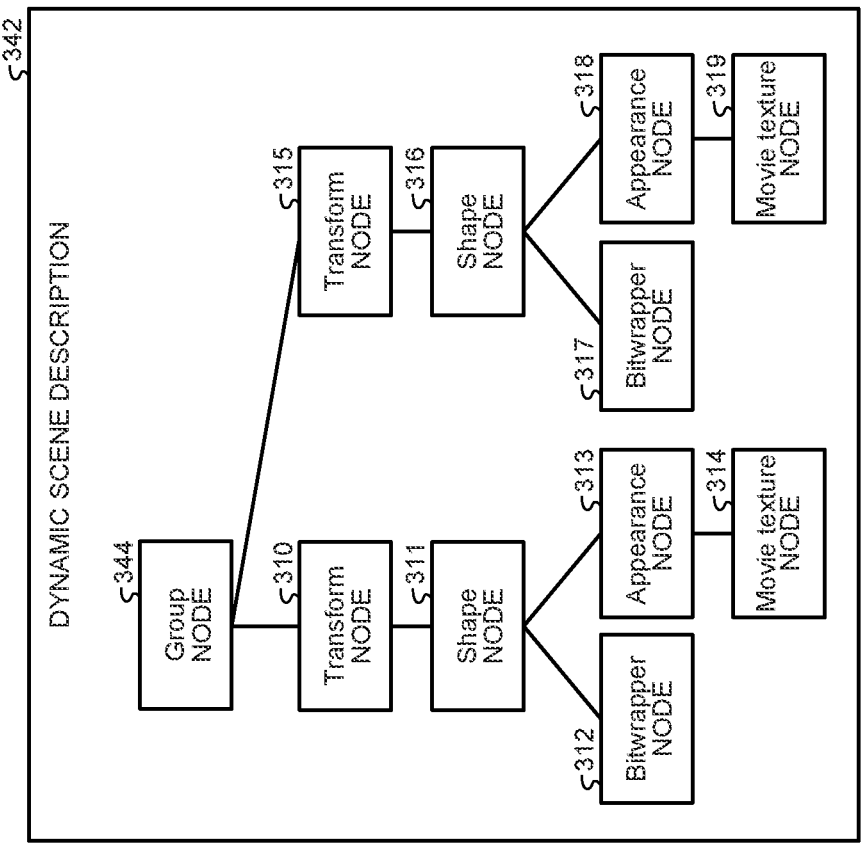
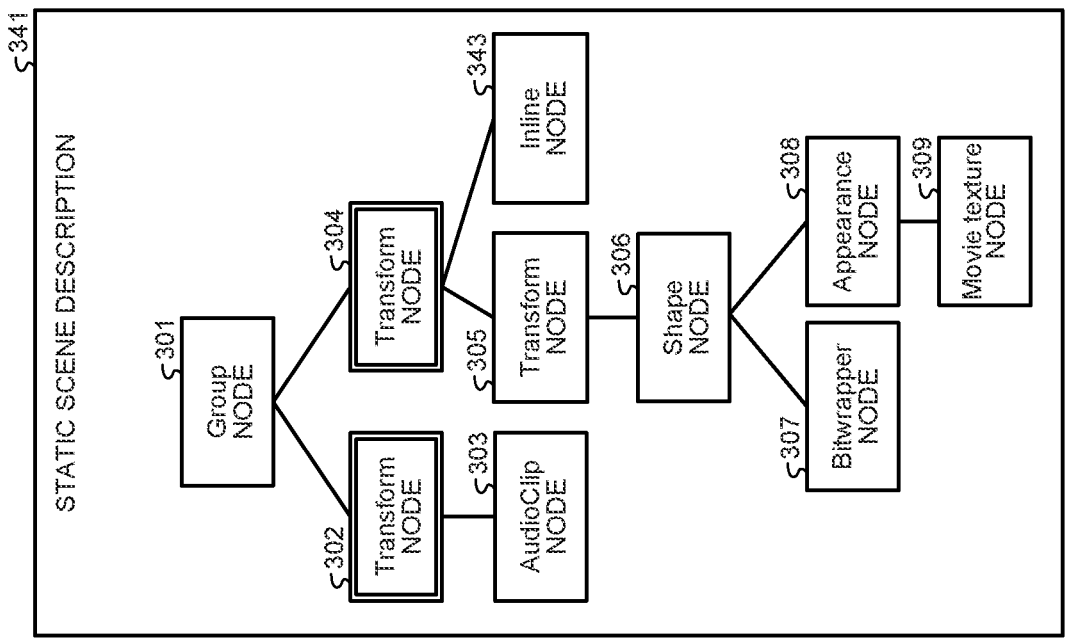

FIG.14

```
aligned(8) class StaticSDBox extends Box('sscd') {
    bit(8) SceneDescription;// STATIC SCENE DESCRIPTION
}
```

FIG.16

```
aligned(8) class StaticSDBox extends Box('sscd') {
  unsigned int(16) sd_count; //NUMBER OF INCLUDED SCENE DESCRIPTIONS
  for (int I; I< sd_count; i++) {
    unsigned int(16) SD_size; //NUMBER OF BYTES OF SCENE DESCRIPTION
    bit(8*SD_size) SceneDescription;//  STATIC SCENE DESCRIPTION
  }
}
```

FIG.17
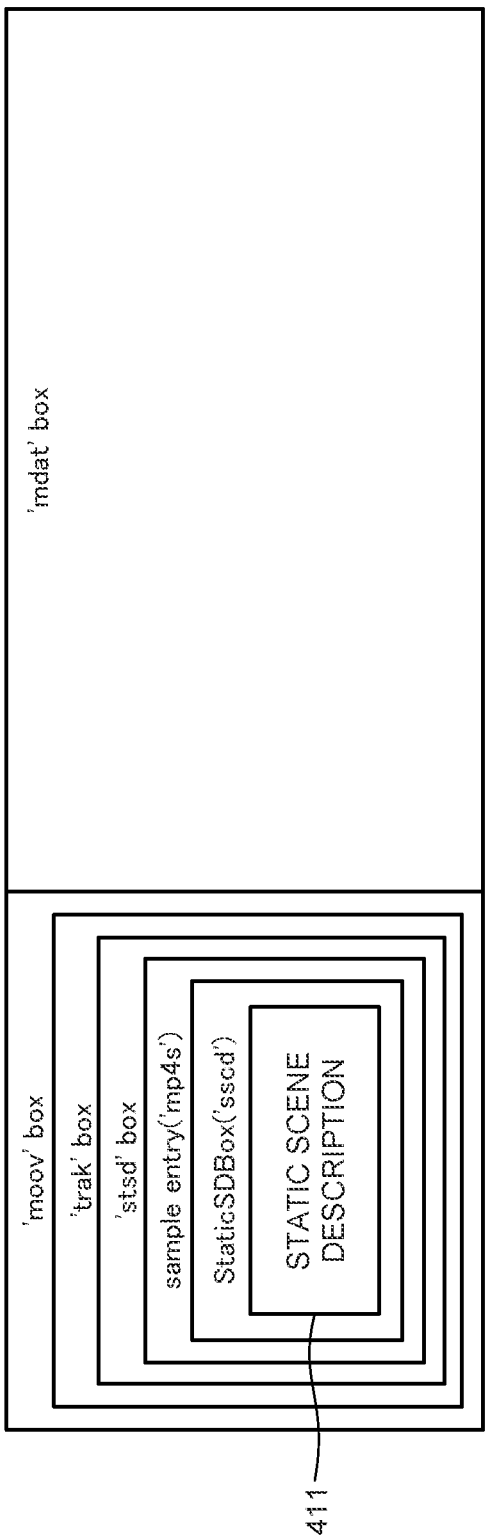
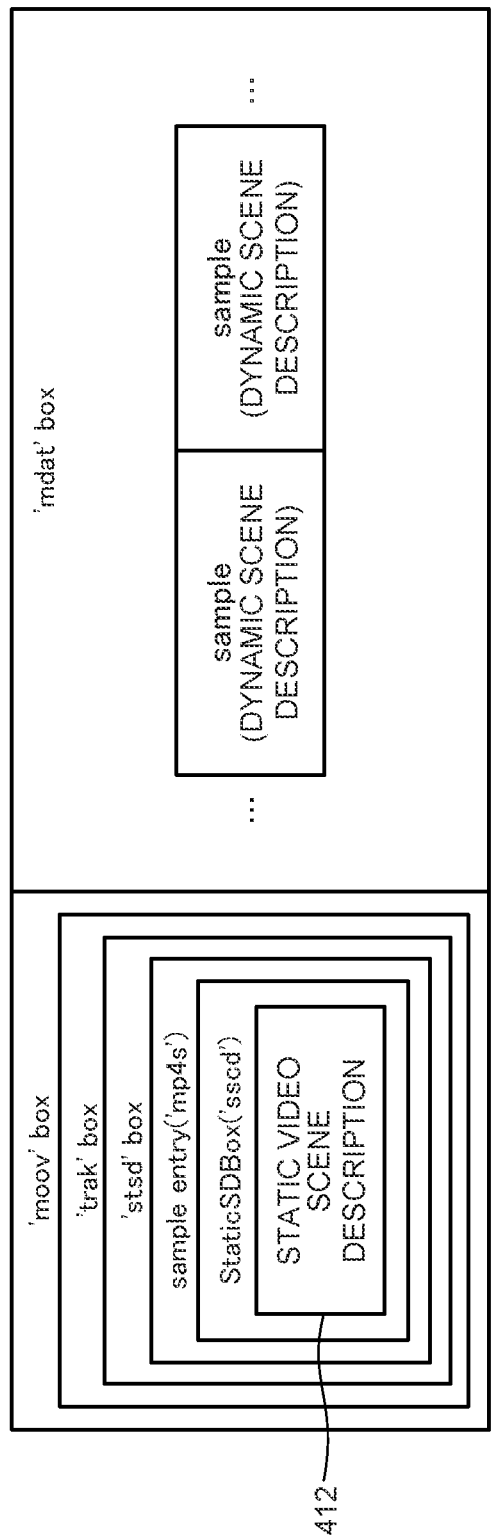

FIG.20

```
aligned(8) class StaticAudioMeta extends Box('sscd') {
  unsigned int(16) num_obj; // NUMBER OF AUDIO OBJECTS OF STATIC POSITION
  for (int i=0; i< num_obj; i++) {
    unsigned int(16) object_id; //id INDICATING AUDIO OBJECT OF STATIC POSITION
  }
  unsigned int(16) meta_size // SIZE OF STATIC AUDIO OBJECT METADATA
    bit(8*meta_size) metadata;// STATIC AUDIO OBJECT METADATA
}
```

FIG.23

| Elements and attributes for Scene Transform description | @Use | Description |
|---|---|---|
| ST | 1 | COORDINATE TRANSFORMATION INFORMATION OF SCENE IS INDICATED |
| ST@translation_x | 0 | TRANSLATION IN x-AXIS DIRECTION (0 WHEN OMITTED) |
| ST@translation_y | 0 | TRANSLATION IN y-AXIS DIRECTION (0 WHEN OMITTED) |
| ST@translation_z | 0 | TRANSLATION IN z-AXIS DIRECTION (0 WHEN OMITTED) |
| ST@rotaition_x | 0 | ROTATION OF x-AXIS (0 WHEN OMITTED) |
| ST@rotaition_y | 0 | ROTATION OF y-AXIS (0 WHEN OMITTED) |
| ST@rotaition_z | 0 | ROTATION OF z-AXIS (0 WHEN OMITTED) |
| ST@scale_x | 0 | ENLARGEMENT OF x-AXIS (1 WHEN OMITTED) |
| ST@scale_y | 0 | ENLARGEMENT OF y-AXIS (1 WHEN OMITTED) |
| ST@scale_z | 0 | ENLARGEMENT OF z-AXIS (1 WHEN OMITTED) |

FIG.24

```
<SupplimentalProperty schemeIdUri="SceneTransform">
  <ST translation_x="10" scale_z="2"/>
</SupplimentalProperty>
```

FIG.25

```
aligned(8) class StaticAudioMeta extends Box('sctr') {
  int(32) taranslate_x;          // 16. 16 fixed point number TRANSLATION IN x-AXIS DIRECTION (0 WHEN OMITTED)
  int(32) taranslate_y;          // 16. 16 fixed point number TRANSLATION IN y-AXIS DIRECTION (0 WHEN OMITTED)
  int(32) taranslate_z;          // 16. 16 fixed point number TRANSLATION IN z-AXIS DIRECTION (0 WHEN OMITTED)
  int(32) rotation_x;            // 16. 16 fixed point number ROTATION OF x-AXIS (0 WHEN OMITTED)
  int(32) rotation_y;            // 16. 16 fixed point number ROTATION OF y-AXIS (0 WHEN OMITTED)
  int(32) rotation_z;            // 16. 16 fixed point number ROTATION OF z-AXIS (0 WHEN OMITTED)
  unsigned int(32) scale_x;      // 16. 16 fixed point number ENLARGEMENT OF x (1 WHEN OMITTED)
  unsigned int(32) scale_y;      // 16. 16 fixed point number ENLARGEMENT OF y (1 WHEN OMITTED)
  unsigned int(32) scale_z;      // 16. 16 fixed point number ENLARGEMENT OF z (1 WHEN OMITTED)
}
```

INFORMATION PROCESSING APPARATUS, REPRODUCTION PROCESSING APPARATUS, AND INFORMATION PROCESSING METHOD

CROSS REFERENCE TO PRIOR APPLICATION

This application is a National Stage Patent Application of PCT International Patent Application No. PCT/JP2020/032747 (filed on Aug. 28, 2020) under 35 U.S.C. § 371, which claims priority to Japanese Patent Application No. 2019-181077 (filed on Sep. 30, 2019), which are all hereby incorporated by reference in their entirety.

FIELD

The present invention relates to an information processing apparatus, a reproduction processing apparatus, and an information processing method.

BACKGROUND

In current video distribution, distribution of two-dimensional content called two-dimensional video used for distribution of a movie and the like is the mainstream. Furthermore, distribution of 360-degree video that can be viewed in all directions is also provided at various websites on the Internet. The 360-degree video is also referred to as 3 DoF (Degree of Freedom) video. In both the two-dimensional video and the 3DoF video, basically content encoded two-dimensionally is distributed and displayed on the client device.

Meanwhile, distribution of 6DoF video content called 6DoF video has been proposed as video with a further degree of freedom. The 6DoF video content can be viewed in all directions in a three-dimensional space, and further, a free position in the space can be selected. The 6DoF video content is content that expresses a three-dimensional space and can freely set a viewpoint direction and a viewpoint position at the time of reproduction. Similarly for audio, there is 6DoF audio that distributes 6DoF audio content in which a viewing position and a viewing direction in a three-dimensional space can be selected. Content obtained by combining 6DoF video content and 6DoF audio content is referred to as 6DoFAV content. The 6DoF video expresses a three-dimensional space with one or a plurality of pieces of three-dimensional model data. Hereinafter, the three-dimensional model data is referred to as 3D model data. 6DoF audio expresses a plurality of sound sources existing in a three-dimensional space by a plurality of audio objects.

The 6DoFAV content is content in which a 3D space including 3D model data that includes 6DoF video called a scene and an audio object that includes 6DoF audio is continuous for each time. Each scene includes a bit stream of 3D model data or an audio object and a scene description. The scene description includes arrangement information of 3D model data for reconstructing a three-dimensional space and access information of a bit stream.

Here, the position of the 3D model data may change for each time. When the 3D model data changes for each time, the scene changes for each time. For example, in MPEG-4Scene Description, in a case where the scene changes for each time, difference information of a changing node can be transmitted in order to reduce the amount of data to be transferred. With this mechanism, it is not necessary to hold the information of the entire scene at all times.

CITATION LIST

Non Patent Literature

Non Patent Literature 1: "ISO/IEC 14496-12", Fifth Edition, 2015 Dec. 15

SUMMARY

Technical Problem

However, in a case where the random access reproduction of selecting the time and reproducing is realized in the 6DoF content, it is difficult to reproduce the entire scene when the scene information of the time at which random access is desired is the difference information. Therefore, in order to realize reproduction by random access, a technology has been proposed in which a random access point for acquiring configuration information of the entire scene is periodically set, and the information of the entire scene is held at the random access point.

However, the scene description of the 6DoFAV content includes static information that does not change over time and dynamic information that changes over time. When the scene description includes static information and dynamic information, both the static information and the dynamic information are acquired for each random access point. That is, the client needs to receive even static information that is originally not required to be received many times, which may cause decrease in transmission efficiency and increase in processing cost.

Therefore, the present disclosure proposes an information processing apparatus, a reproduction processing apparatus, and an information processing method that improve data transmission efficiency.

Solution to Problem

To solve the problems described above, an information processing apparatus according to an embodiment of the present disclosure includes a preprocessing unit that generates, as scene configuration information indicating a configuration of a scene of 6DoF content, dynamic scene configuration information that changes over time and static scene configuration information that does not change over time, the static scene configuration information being scene configuration information different from the dynamic scene configuration information.

BRIEF DESCRIPTION OF DRAWINGS

FIG. 4 is a diagram illustrating an example of syntax stored in each node of the scene graph.

FIG. 6 is a diagram illustrating a scene description generated according to a first embodiment.

FIG. 7 is a diagram illustrating storage of each scene description in an ISOBMFF file in the first embodiment.

FIG. 11 is a diagram illustrating a scene description generated according to a modification (1) of the first embodiment.

FIG. 14 is a diagram illustrating an example of syntax registered in a box that stores a static scene description.

FIG. 16 is a diagram illustrating another example of syntax registered in a box that stores a static scene description.

FIG. 17 is a diagram illustrating another example of a storage state in a case where each scene description is stored in a different ISOBMFF.

FIG. 20 is a diagram illustrating an example of syntax registered in a box that stores static audio object metadata.

FIG. 23 is a diagram illustrating an example of a descriptor of coordinate transformation information.

FIG. 24 is a diagram illustrating a description example of syntax using the descriptor of the coordinate transformation information.

FIG. 25 is a diagram of an example of syntax illustrating coordinate transformation information stored in the ISOBMFF.

DESCRIPTION OF EMBODIMENTS

Hereinafter, embodiments of an information processing apparatus, a reproduction processing apparatus, and an information processing method disclosed in the present application will be described in detail with reference to the drawings. Note that the scope disclosed in the present technology includes not only the contents described in the embodiments but also the contents described in the following non-patent literatures known at the time of filing.

Non-Patent Literature 1: (described above)
Non-Patent Literature 2: "ISO/IEC 14496-11", Second Edition, 2015 Dec. 1
Non-Patent Literature 3: "ISO/IEC 23009-1", Third Edition, 2019 August
Non-Patent Literature 4: "ISO/IEC 23008-3", Second Edition, 2019 February That is, the content described in the above-described non-patent literature also serves as a basis for determining the support requirement. For example, even in a case where the File Structure described in Non-Patent Literature 1, the structures/terms used in the Scene Description described in Non-Patent Literature 2, the terms used in the MPEG-DASH standard described in Non-Patent Literature 3, and the structures/terms used in the 3D Audio standard described in Non-Patent Literature 4 are not directly described in the embodiments, they fall within the disclosure scope of the present technology and satisfy the support requirements of the claims. In addition, for example, technical terms such as parsing, syntax, and semantics are similarly within the disclosure scope of the present technology even in a case where there is no direct description in the embodiments, and satisfy the support requirements of the claims.

First Embodiment

[Configuration of System According to First Embodiment]

Figure 1:
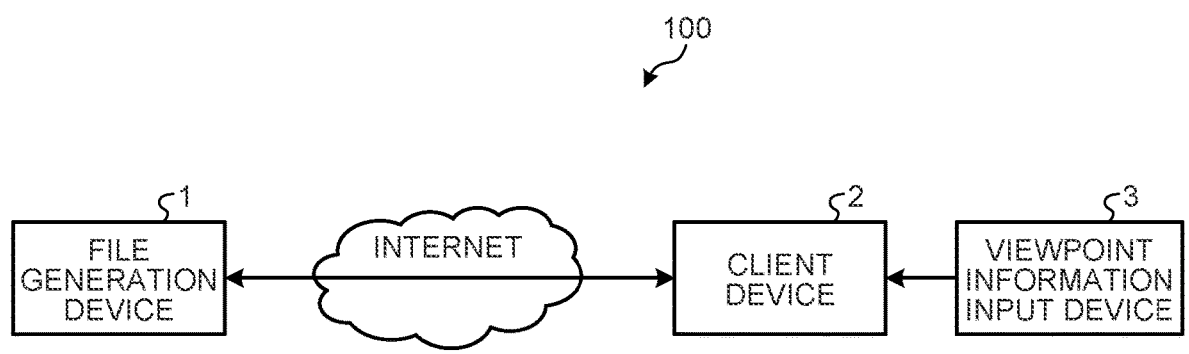
FIG. 1 is a system configuration diagram of an example of a distribution system.

FIG. 1 is a system configuration diagram of an example of a distribution system. A distribution system 100 includes a file generation device 1 that is an information processing apparatus, a client device 2 that is a reproduction processing apparatus, a viewpoint information input device 3, and a WEB server. Here, although one device is illustrated in FIG. 1, the distribution system 100 may include a plurality of file generation devices 1, client devices 2, and viewpoint information input devices 3.

The file generation device 1 generates 6DoFAV content obtained by combining 6DoF video content of 6DoF video and 6DoF audio content. The file generation device 1 uploads the generated 6DoFAV content to the WEB server. Here, in the present embodiment, a configuration in which the WEB server provides 6DoFAV content to the client device 2 will be described, but the distribution system 100 can adopt another configuration. For example, the file generation device 1 may include a function of a WEB server, store the generated 6DoFAV content in the file generation device 1 itself, and provide the generated 6DoFAV content to the client device 2.

A WEB server (not illustrated) and the like is connected to the client device 2 via the Internet. Hereinafter, a WEB server will be described as an example of a device that provides data to the client device 2. The WEB server holds 6DoFAV content. Then, the WEB server provides the designated 6DoFAV content according to the request from the client device 2.

The client device 2 transmits a transmission request for 6DoFAV content generated by the file generation device 1 to the WEB server. Then, the client device 2 acquires the 6DoFAV content designated by the transmission request from the WEB server. Furthermore, the client device 2 receives input of information of the viewpoint position and the line-of-sight direction from the viewpoint information input device 3. Then, the client device 2 performs rendering using the data of the 6DoFAV content in the line-of-sight direction at the designated viewpoint position, generates voice and an image for display, and displays the voice and the image on a display device such as a monitor. Here, in a case where the file generation device 1 has a function of a WEB server, the client device 2 acquires 6DoFAV content from the file generation device 1.

The viewpoint information input device 3 is a device that inputs the viewpoint position and the line-of-sight direction selected by the operator. The viewpoint information input device 3 may input each piece of information by hand like a controller of a game machine and the like, or may input each piece of information obtained from the position and direction of the eyes of the actual operator like a head mounted display.

Here, the 6DoF video will be described. The 6DoF video expresses a three-dimensional space with one or a plurality of pieces of three-dimensional model data. Hereinafter, the three-dimensional model data is referred to as 3D model data. The 3D model data is data of a 3D model that is any of (1) one object in the 3D space, (2) a part of the object in (1), and (3) a set of a plurality of objects in the 3D space.

The 3D model data is expressed using a coordinate system in a normalized bounding box that is a local coordinate system of the 6DoF video and is compressed and encoded into a bit stream. A scene description is used to arrange the bit stream in a three-dimensional space.

There is a plurality of standards of the scene description. Basically, a scene in which each 3D model data for each time is displayed is expressed by a graph having a tree hierarchical structure called a scene graph, and the scene graph is expressed in a binary format or a text format. Here, the scene graph is space display control information, and is configured by defining information related to display of 3D model data with a node as a constituent unit and hierarchically combining a plurality of nodes. The node includes a node of coordinate transformation information for transformation from one coordinate system to another coordinate system, a node of position information or size information of 3D model data, and a node of access information to 3D model data and audio data.

Note that, in the following description, it is assumed that the 6DoFAV content includes scene description data that is space display control information, and media data (for example, mesh data and texture data of 3D model data are expressed together) of a plurality of pieces of 3D model data, as audio data. Another format such as Point Cloud is also applicable to the media data of the 3D model data. In addition, the scene description data conforms to MPEG-4 Scene Description (ISO/IEC 14496-11).

The MPEG-4 Scene Description data is obtained by binarizing the scene graph in a format called Binary Format for Scenes (BIFS). The scene graph can be transformed into the BIFS by predetermined algorithm. In addition, by storing the data in ISO Base Media File Format (ISOBMFF), a scene can be specified for each time, and 3D model data of which position and size change can be expressed. The format of the ISOBMFF corresponds to an example of a "format that specifies configuration information for each time".

On the other hand, the 6DoF audio content expresses each sound source object existing in a three-dimensional space as audio object data. In order to enable listening at a free position based on a bit stream expressing an audio object in a three-dimensional space capable of listening at a fixed position specified by MPEG-H 3D audio (ISO/IEC 23008-3) as audio object data, a method for storing audio object metadata such as arrangement information of the audio object data in the bit stream is being studied. In this case, a plurality of pieces of audio object data and its position information are included in the bit stream.

Figure 2:
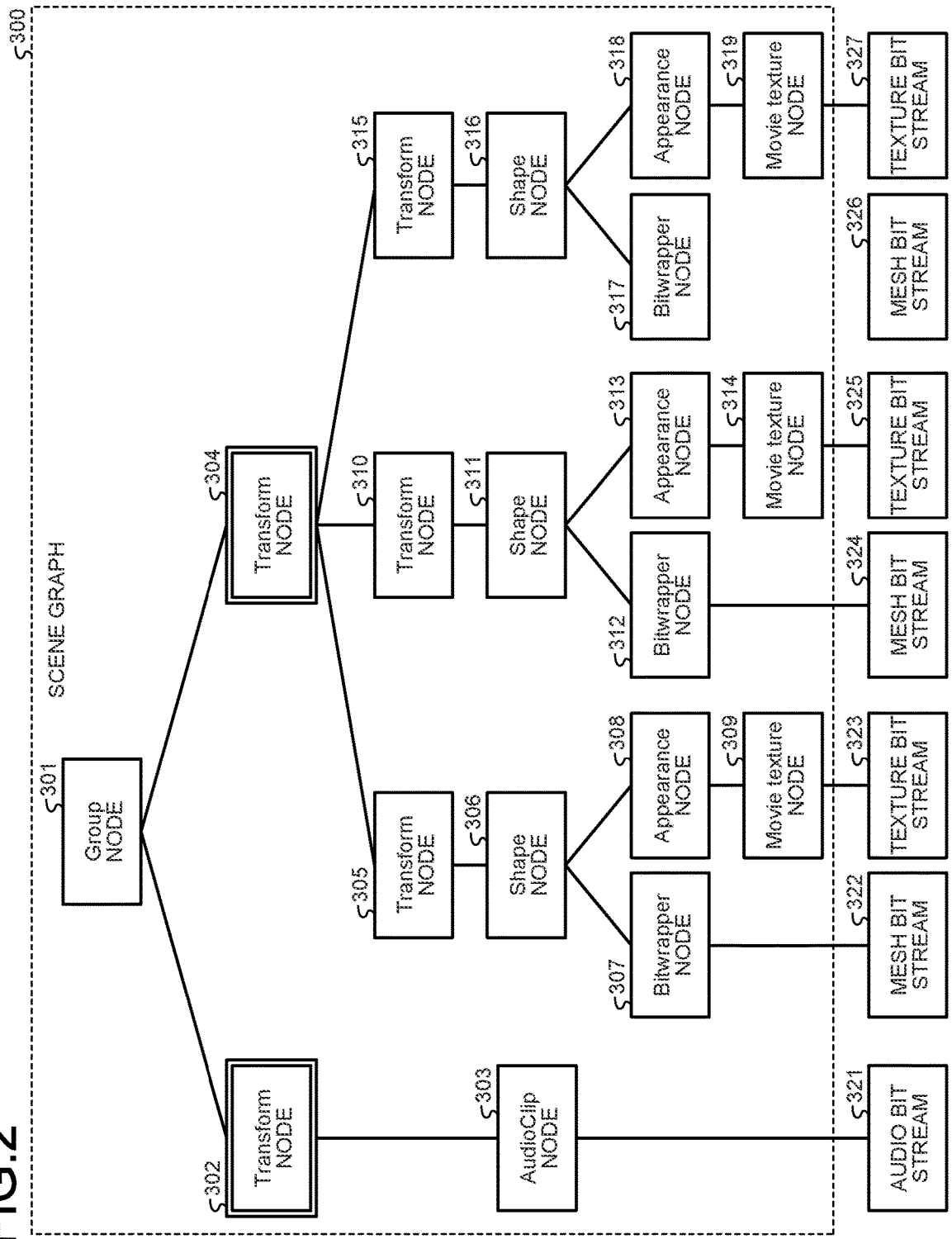
FIG. 2 is a diagram illustrating an example of a scene graph.

FIG. 2 is a diagram illustrating an example of a scene graph. When 6DoFAV content is expressed, the scene graph is as illustrated in FIG. 2, for example. The 6DoFAV content expressed by a scene graph 300 of FIG. 2 includes a node expressing information of a plurality of pieces of 3D model data including the video scene and a node expressing audio information of the audio scene. A route Group node 301 has a Transform node 302 and a Transform node 304 as child nodes.

A portion under the Transform node 302 is a scene graph indicating an audio scene. The Transform node 302 is coordinate transformation information of the audio scene. This coordinate transformation information is for matching the coordinate system of the audio scene with the coordinate system of the video scene. The Transform node 302 includes an AudioClip node 303 as a child node. The AudioClip node 303 includes access information to an audio bit stream 321. The Transform node 302 and the AudioClip node 303 are scene graphs of audio scenes.

Figure 3:
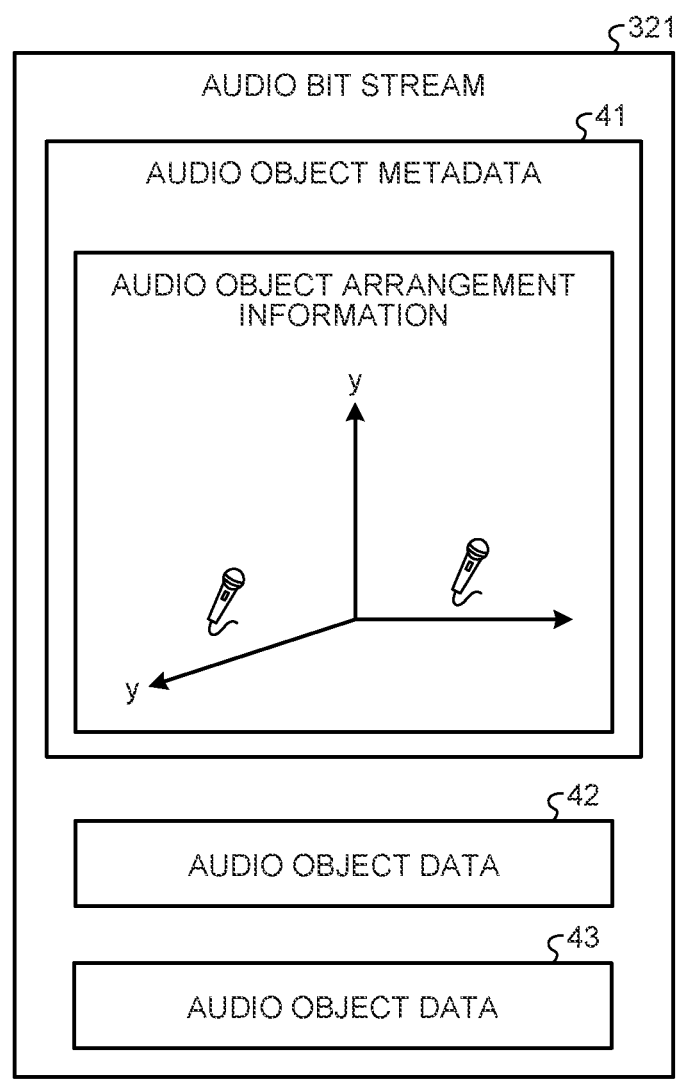
FIG. 3 is a diagram illustrating a configuration of an audio bit stream.

Here, the audio bit stream 321 has, for example, the configuration illustrated in FIG. 3. FIG. 3 is a diagram illustrating a configuration of an audio bit stream. The audio bit stream 321 includes audio object metadata 41, audio object data 42, and audio object data 43.

The audio object metadata 41 includes audio object arrangement information expressing coordinates at which the audio object is arranged. Since there are two pieces of audio object data 42 and 43, the audio object arrangement information includes arrangement information of the two audio objects.

Description will be continued with FIG. 2 again. A portion under the Transform node 304 is a scene graph indicating a video scene. The Transform node 304 is coordinate transformation information of the video scene. This is for matching the coordinate system of the audio scene with the coordinate system of the video scene. In the present embodiment, the coordinates of both the audio scene and the video scene are transformed to match one coordinate, but the present invention is not limited to this, and for example, one coordinate of the audio scene or the video scene may be transformed to match the other coordinate. The Transform node 304 includes Transform nodes 305, 310, and 315 as child nodes.

The Transform nodes 305, 310, and 315 include information designating the position and size of each piece of 3D model data. The Transform node 305 has a Shape node 306 as a child node. The Transform node 310 has a Shape node 311 as a child node. The Transform node 315 has a Shape node 316 as a child node.

The Shape nodes 306, 311, and 316 include shape and material information for defining the shape of the 3D model data. The shape node 306 includes a Bitwrapper node 307 and an Appearance node 308 as child nodes. The Shape node 311 includes a Bitwrapper node 312 and an Appearance node 313 as child nodes. The Shape node 316 includes a Bitwrapper node 317 and an Appearance node 318 as child nodes. The Bitwrapper nodes 307, 312, and 317 include access information to mesh bit streams 322, 324, and 326, respectively.

The Appearance nodes 308, 313, and 318 include information expressing texture and texture of the 3D model data. The Appearance node 308 includes a Movie texture node 309 as a child node. The Appearance node 313 includes a Movie texture node 314 as a child node. The Appearance node 318 includes a Movie texture node 319 as a child node. The Movie texture nodes 309, 314, and 319 include access information to texture bit streams 323, 325, and 327, respectively.

The Transform node 305, the Shape node 306, the Bitwrapper node 307, the Appearance node 308, and the Movie texture node 309 are scene graphs of one piece of 3D model data. In addition, the Transform node 310, the Shape node 311, the Bitwrapper node 312, the Appearance node 313, and the Movie texture node 314 are scene graphs of another piece of 3D model data. In addition, the Transform node 315, the Shape node 316, the Bitwrapper node 317, the Appearance node 318, and the Movie texture node 319 are scene graphs of another piece of 3D model data.

Here, the information held by each node includes static information that does not change over time and dynamic information that changes over time. For example, the coordinate transformation information includes both static coordinate transformation information that does not change over time and dynamic coordinate transformation information that changes over time. The static coordinate transformation information is coordinate transformation information for transforming a coordinate system into another coordinate system, and coordinate transformation information of 3D model data of which arrangement does not change according to the lapse of time. In addition, the dynamic coordinate transformation information is coordinate transformation information of 3D model data of which arrangement changes according to the lapse of time.

FIG. 4 is a diagram illustrating an example of syntax stored in each node of the scene graph. In these nodes, a field is set for each (type of) information, and information corresponding to the field is stored in each field.

[Configuration of File Generation Device According to First Embodiment]

Figure 5:
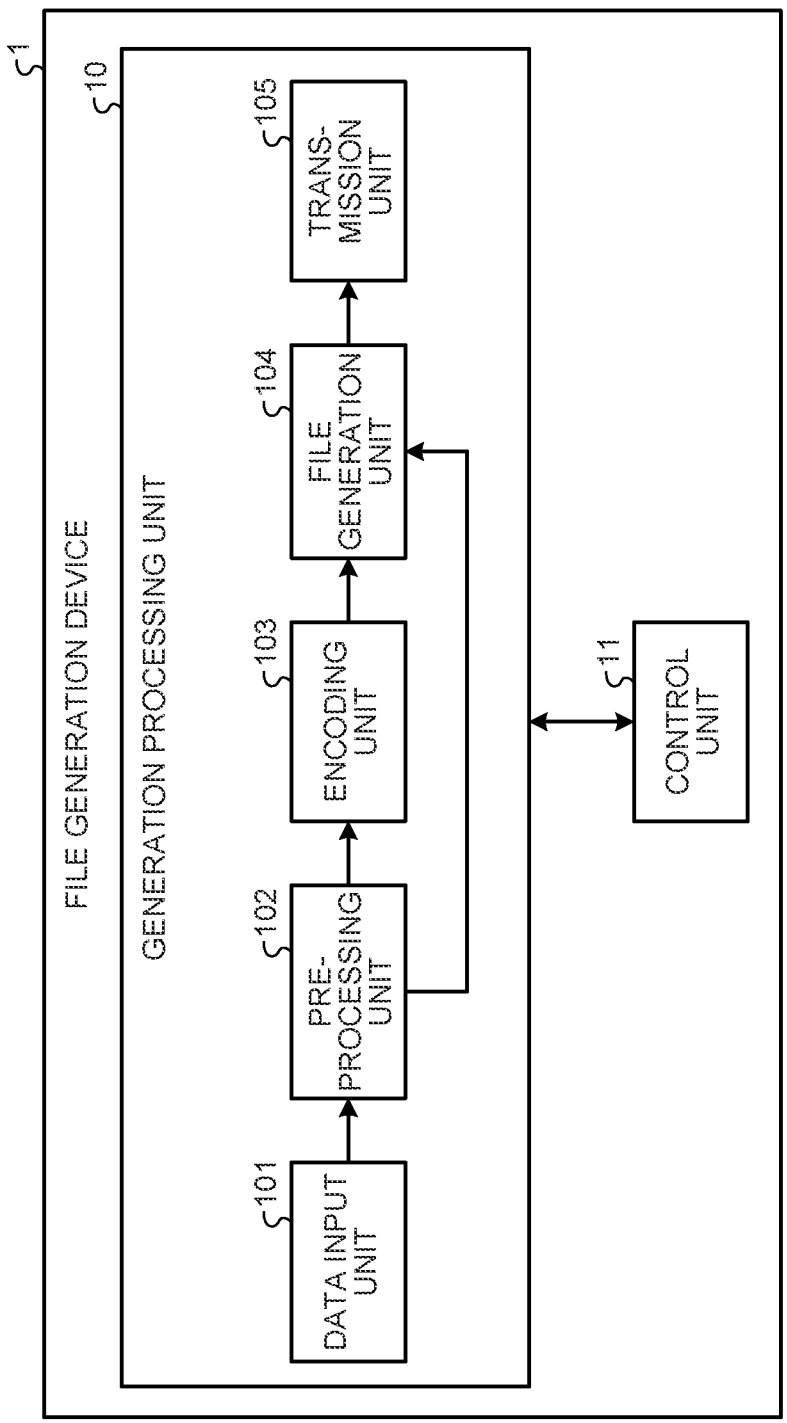
FIG. 5 is a block diagram of a file generation device.

Next, details of the file generation device 1 will be described. FIG. 5 is a block diagram of a file generation device. As illustrated in FIG. 5, the file generation device 1 includes a generation processing unit 10 and a control unit 11. The control unit 11 executes processing related to control of the generation processing unit 10. For example, the control unit 11 performs integrated control such as operation timing of each unit of the generation processing unit 10. The generation processing unit 10 includes a data input unit 101, a preprocessing unit 102, an encoding unit 103, a file generation unit 104, and a transmission unit 105.

The data input unit 101 receives an input of data. The data received by the data input unit 101 includes metadata such as 3D model data and audio object data, and arrangement information of the audio object and the 3D model data. The data input unit 101 outputs the acquired data to the preprocessing unit 102.

The preprocessing unit 102 determines a bit stream configuration, and generates a scene graph using metadata of each 3D model data and audio object data and access information to the bit stream. As scene configuration information expressing a configuration of a scene of 6DoF content, a dynamic scene graph of dynamic scene configuration information that changes over time, and a static scene graph of static scene configuration information that does not change over time, the static scene configuration information being scene configuration information different from the dynamic scene configuration information, are generated. Details of the preprocessing unit 102 will be described below.

The preprocessing unit 102 determines a bit stream configuration, and generates a scene graph using metadata of each 3D model data and audio object data and access information to the bit stream. A dynamic scene graph of dynamic scene configuration information that changes over time, and a static scene graph of static scene configuration information that does not change over time, the static scene configuration information being scene configuration information different from the dynamic scene configuration information, are generated. The preprocessing unit 102 generates a static scene graph with the coordinate transformation information of each of the audio scene and the video scene, which is static information that does not change over time, and the access information to the audio scene and the video scene, and a dynamic scene graph with the information of the video scene including dynamic information that changes over time. In the case of the data of the scene graph 300 of FIG. 2, in the preprocessing unit 102, the coordinate transformation information stored in the Transform node 302, the access information stored in the AudioClip node 303, and the coordinate transformation information stored in the Transform node 304 are static scene graphs, and the other video scene portions are dynamic scene graphs. Then, the preprocessing unit 102 outputs the 3D model data, the audio object data, and the generated scene graph to the encoding unit 103.

The encoding unit 103 encodes the 3D model data and the audio object data to generate respective bit streams. A static scene graph and a dynamic scene graph are encoded to generate scene descriptions. Details of the encoding unit 103 will be described below.

The encoding unit 103 receives inputs of the 3D model data and the audio object data from the preprocessing unit 102. Then, the encoding unit 103 encodes the 3D model data and the audio object data to generate respective bit streams. Then, the encoding unit 103 outputs the generated bit streams to the file generation unit 104.

In addition, the encoding unit 103 receives an input of a static scene graph. Then, the encoding unit 103 encodes the static scene graph to generate a scene description including static information. Hereinafter, a scene description including static information is referred to as a "static scene description".

In addition, the encoding unit 103 receives an input of a dynamic scene graph. Then, the encoding unit 103 encodes the dynamic scene graph to generate a scene description including dynamic information. Hereinafter, a scene description including both dynamic information is referred to as a "dynamic scene description".

FIG. 6 is a diagram illustrating a scene description generated according to a first embodiment. In the present embodiment, the encoding unit 103 generates a static scene description 331 illustrated in FIG. 6 with respect to the scene graph 300 illustrated in FIG. 2. In addition, the encoding unit 103 generates a dynamic scene description 332 illustrated in FIG. 6 with respect to the scene graph 300 illustrated in FIG. 2.

Here, the encoding unit 103 sets access information from the static scene description 331 to the dynamic scene description 332 as a child node. For example, in the case of MPEG-4 Scene Description, the encoding unit 103 can use an Inline node 333 as access information to the dynamic scene description 332 as a child node. In this case, the encoding unit 103 stores access information of a Group node 334 to be described later in the Inline node 333. Then, the encoding unit 103 outputs the data of the static scene description 331 to the file generation unit 104.

In addition, the encoding unit 103 generates the Group node 334 as a route in the dynamic scene description 332, and arranges the Transform nodes 305, 310, and 315 as child nodes of the Group node 334. Then, the encoding unit 103 outputs the data of the dynamic scene description 332 to the file generation unit 104.

In this manner, the encoding unit 103 individually generates the static scene description 331 and the dynamic scene description 332.

The file generation unit 104 generates a file of the generated bit stream, generates a file including a static scene description that does not change for each time, and generates a file including a dynamic scene description that changes for each time. Details of the file generation unit 104 will be described below.

The file generation unit 104 receives an input of a bit stream from the encoding unit 103. Then, the file generation unit 104 converts the acquired bit stream into a file for each segment, and generates a segment file of the bit stream.

In addition, the file generation unit 104 receives an input of data of the static scene description 331 from the encoding unit 103. Then, the file generation unit 104 converts the data of the static scene description 331 into a file for each segment, and generates a segment file of the static scene description 331.

The segment file of the static scene description 331 generated by the file generation unit 104 is stored in an ISOBMFF as illustrated in a file 401 of FIG. 7. FIG. 7 is a diagram illustrating storage of each scene description in an ISOBMFF file in the first embodiment. The file generation unit 104 stores management information of the static scene description 331 in 'moov'box. Specifically, the file generation unit 104 stores information of a track that is a media data unit in 'trak'box. In addition, the file generation unit 104 stores information such as the type of media data and the display timing (time information) in 'stsd'box. Then, the file generation unit 104 stores mp4s as a coding name of the sample entry. In addition, the file generation unit 104 stores the actual data of the static scene description 331 in 'mdat'box. Here, since the static scene description 331 is fixed without changing according to the time, the time information is set in a manner that the same static scene description 331 is used at any time. Therefore, one static scene description 331 corresponding to all times is stored as a sample in 'mdat'box of the file 401 including the static scene description 331.

In addition, the file generation unit 104 receives an input of data of the dynamic scene description 332 from the encoding unit 103. Then, the file generation unit 104 converts the data of the dynamic scene description 332 into a file for each segment, and generates a segment file of the dynamic scene description 332.

The segment file of the dynamic scene description 332 generated by the file generation unit 104 is stored in an ISOBMFF as illustrated in a file 402 of FIG. 7. The file generation unit 104 stores management information similar to that of the file 401 in 'moov'box. In addition, the file generation unit 104 stores the actual data of the static scene description 331 in 'mdat'box. In this case, the file generation unit 104 stores the dynamic scene description 332 at each time as a sample in 'mdat'box.

When MPEG-DASH (Dynamic Adaptive Streaming over HTTP, ISO/IEC 23009-1) is used, the file generation unit 104 generates a media presentation description (MPD) file based on the data acquired from the preprocessing unit 102. The MPD file stores meta information of 6DoFAV content such as a media type and information of a segment file of a moving image or voice.

The transmission unit 105 acquires the segment files of the bit stream, the static scene description, and the dynamic scene description from the file generation unit 104, and transmits and uploads them to the WEB server.

[Configuration of Client Device According to First Embodiment]

Figure 8:
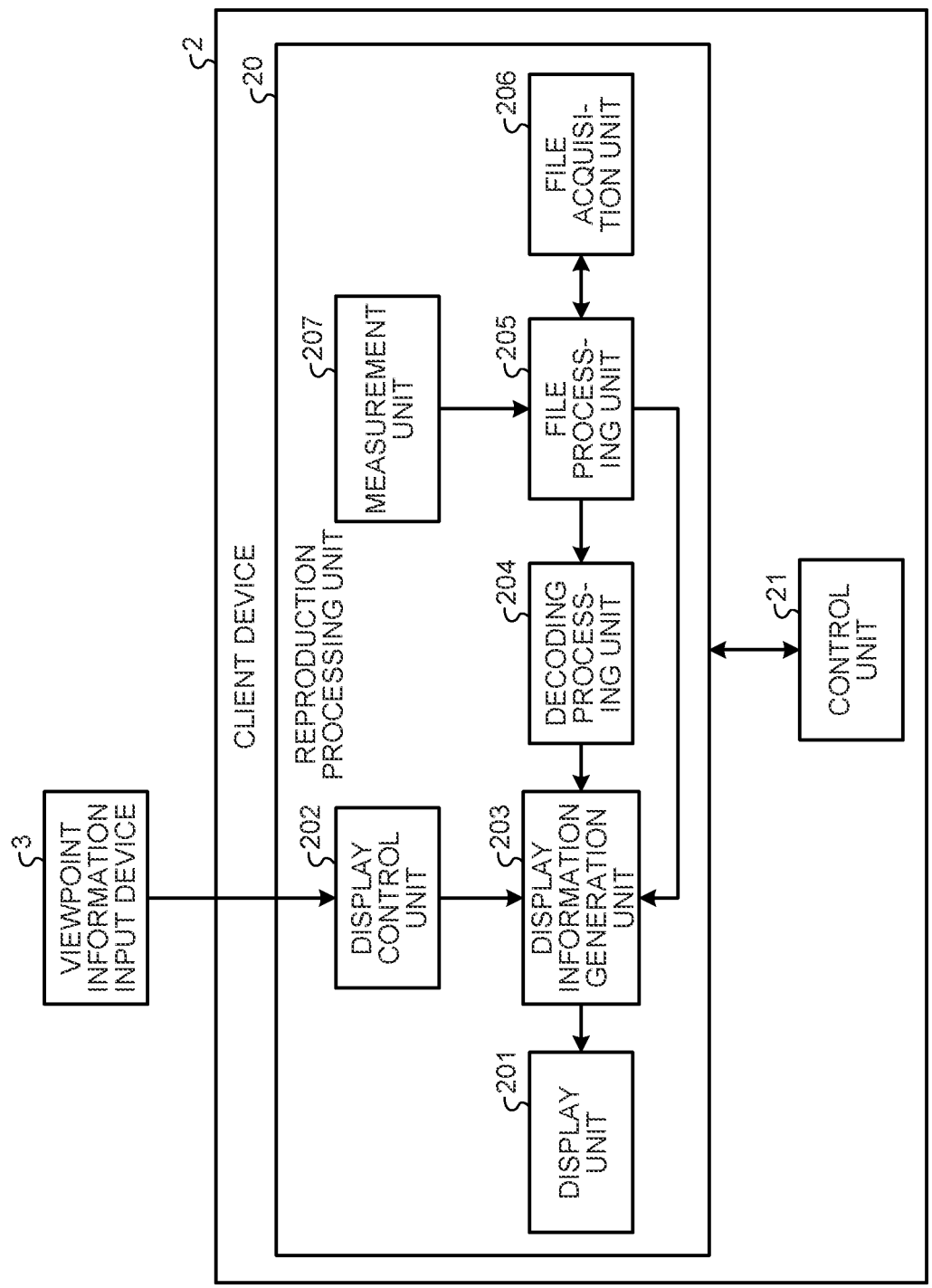
FIG. 8 is a block diagram of a client device.

FIG. 8 is a block diagram of a client device. As illustrated in FIG. 8, the client device 2 includes a reproduction processing unit 20 and a control unit 21. The control unit 21 controls operation of each unit of the reproduction processing unit 20. For example, the control unit 21 integrally controls timing of operation of each unit of the reproduction processing unit 20. The reproduction processing unit 20 includes a display unit 201, a display control unit 202, a display information generation unit 203, a decoding processing unit 204, a file processing unit 205, a file acquisition unit 206, the file acquisition unit 206, and a measurement unit 207.

When MPEG-DASH is used, the file acquisition unit 206 acquires the MPD file corresponding to the 6DoFAV content to be reproduced from the WEB server. In this case, the file acquisition unit 206 acquires information of the static scene description and the dynamic scene description of the 6DoFAV content to be reproduced from the file processing unit 205.

The file acquisition unit 206 acquires a file of the ISOBMFF in which a static scene description of 6DoFAV content to be displayed by accessing a WEB server is stored. Since the static scene description is fixed regardless of the lapse of time of reproduction of the 6DoFAV content, the file acquisition unit 206 acquires the file of the ISOBMFF in which the static scene description is stored once in reproduction of the 6DoFAV content to be displayed. Then, the file acquisition unit 206 outputs the file of the ISOBMFF in which the static scene description is stored to the file processing unit 205.

In addition, the file acquisition unit 206 acquires a file of the ISOBMFF in which a dynamic scene description of 6DoFAV content to be reproduced by accessing a WEB server is stored according to the lapse of time of reproduction processing. Then, the file acquisition unit 206 outputs the file of the ISOBMFF in which the acquired dynamic scene description is stored to the file processing unit 205.

Further, the file acquisition unit 206 acquires the information of the bit stream selected by the file processing unit 205 from the file processing unit 205. Then, the file acquisition unit 206 requests and acquires the segment file of the selected bit stream by accessing the WEB server. After that, the file acquisition unit 206 outputs the acquired segment file of the bit stream to the file processing unit 205.

The measurement unit 207 measures a transmission band of a transmission path between the client device 2 and the WEB server. Then, the measurement unit 207 outputs the measurement result of the transmission band to the file processing unit 205.

In a case where MPEG-DASH is used, the file processing unit 205 receives an input of the MPD file corresponding to the 6DoFAV content to be reproduced from the file acquisition unit 206. Then, the file processing unit 205 acquires a static scene description of 6DoFAV content that parses and reproduces the acquired MPD file. The file processing unit 205 also recognizes a plurality of pieces of data used for adaptive distribution. For example, in the case of adaptive distribution in which the bit rate is switched, information of the segment file of the bit stream corresponding to each bit rate is acquired. In this case, the file processing unit 205 outputs information of the static scene description and the dynamic scene description of the 6DoFAV content to be reproduced to the file acquisition unit 206.

The file processing unit 205 receives an input of a file of the ISOBMFF in which the static scene description is stored from the file acquisition unit 206. The file processing unit 205 acquires the coordinate transformation information, the access information of the dynamic scene description, and the access information of the audio bit stream as the parsing result. In addition, an input of a file of the ISOBMFF in which the dynamic scene description is stored is received from the file acquisition unit 206. Then, the file processing unit 205 parses the dynamic scene description. As a result, the file processing unit 205 acquires arrangement information of 3D model data of the video scene and access information to the 3D model data as the parsing result.

Further, the file processing unit 205 receives an input of the measurement result of the transmission band from the measurement unit 207. Then, the file processing unit 205 selects the segment file of the bit stream to be reproduced based on the parsing result of the static scene description and the dynamic scene description, the information indicating the transmission band acquired from the measurement unit 207, and the like. Then, the file processing unit 205 outputs information of the segment file of the selected bit stream to the file acquisition unit 206.

At this time, adaptive distribution according to the bit rate is realized by changing the segment file of the bit stream to be selected according to the transmission band.

After that, the file processing unit 205 receives an input of the segment file of the selected bit stream from the file acquisition unit 206. Then, the file processing unit 205 extracts data of the bit stream from the segment file of the acquired bit stream and outputs the data to the decoding processing unit 204.

The decoding processing unit 204 receives bit stream data input from the file processing unit 205. Then, the decoding processing unit 204 performs decoding processing with respect to the data of the acquired bit stream. After that, the decoding processing unit 204 outputs the data of the decoded bit stream to the display information generation unit 203.

The display control unit 202 receives an input of information of the viewpoint position and the line-of-sight direction of the operator from the viewpoint information input device 3. Then, the display control unit 202 outputs the acquired viewpoint position and viewpoint direction information to the display information generation unit 203.

The display information generation unit 203 receives the static scene description, the dynamic scene description, the decoded bit stream data, and the acquired information of the viewpoint position and viewpoint direction, and generates display information. Details of the display information generation unit 203 will be described below.

An input of data of a bit stream is received from the decoding processing unit 204. Then, the display information generation unit 203 arranges the audio object and the 3D model data, which are the data of the acquired bit stream, in the three-dimensional space based on the audio object metadata, the static scene description, and the dynamic scene description. Furthermore, the display information generation unit 203 receives an input of information of the viewpoint position and the line-of-sight direction of the operator from the display control unit 202. Then, the display information generation unit 203 performs rendering of the audio object and the 3D model data arranged in the three-dimensional space in accordance with the viewpoint position and the line-of-sight direction to generate voice and an image for display. After that, the display information generation unit 203 supplies the generated display voice and image to a display unit 191.

The display unit 201 includes a display device such as a speaker or a monitor. The display unit 201 receives an input of a voice and an image for display generated by the display information generation unit 203. Then, the display unit 201 causes the display device to display the acquired voice and an image for display.

[File Generation Procedure According to First Embodiment]

Figure 9:
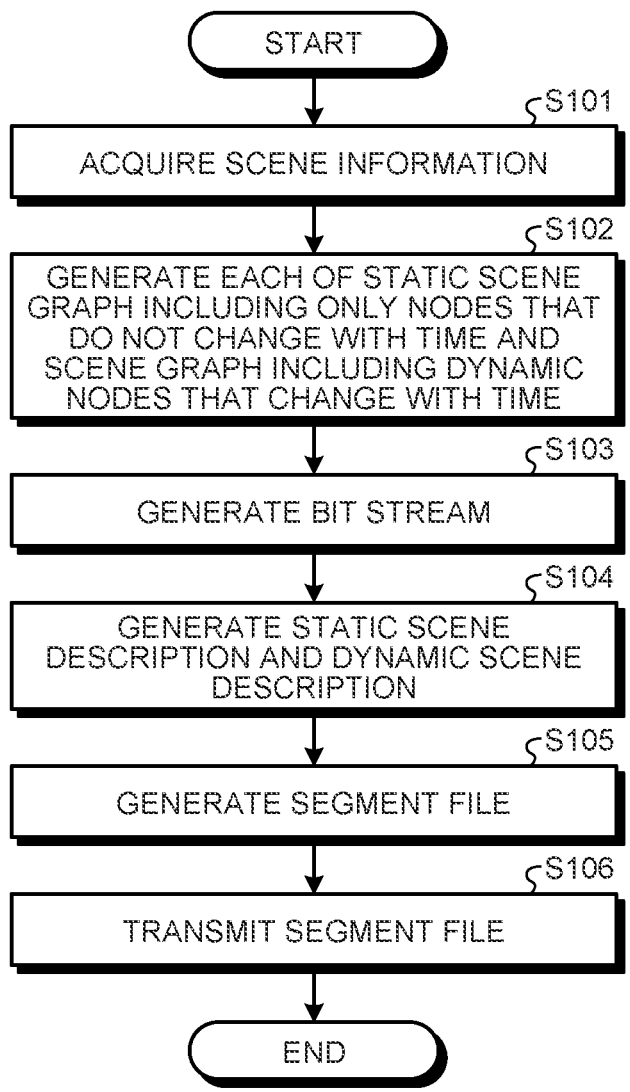
FIG. 9 is a flowchart of file generation processing by the file generation device according to the first embodiment.

As scene configuration information expressing a configuration of a scene of 6DoF content configured by 3D model data in a three-dimensional space, the file generation device 1 generates a scene graph that is dynamic scene configuration information that changes over time, and a scene graph that is static scene configuration information that does not change over time, the static scene configuration information being scene configuration information different from the dynamic scene configuration information. Next, a flow of file generation processing by the file generation device 1 according to the first embodiment will be described in detail with reference to FIG. 9. FIG. 9 is a flowchart of file generation processing by the file generation device according to the first embodiment.

The data input unit 101 acquires scene information including information of the audio object and the 3D model data for each time (step S101). The data input unit 101 also acquires 3D model data and audio object data. Then, the data input unit 101 outputs the acquired various types of information to the preprocessing unit 102.

The preprocessing unit 102 generates a scene graph of the data acquired from the data input unit 101 from the metadata of each of the 3D model data and the audio object data and the access information to the bit stream. At this time, a static scene graph including only nodes that do not change with time and a dynamic scene graph including dynamic nodes that change with time are generated (step S102). The static scene graph includes coordinate transformation information of each of the audio scene and the video scene, and access information to the audio scene and the video scene. The dynamic scene graph includes a video scene graph. Then, the preprocessing unit 102 outputs the 3D model data and the audio object data to the encoding unit 103. In addition, the preprocessing unit 102 outputs the static scene graph and the dynamic scene graph to the encoding unit 103.

The encoding unit 103 encodes the 3D model data and the audio object data acquired from the preprocessing unit 102 and the audio object metadata to generate a bit stream of the 3D model data and a bit stream of the audio (step S103).

In addition, the encoding unit 103 encodes the static scene graph acquired from the preprocessing unit 102 to create a static scene description. In addition, the encoding unit 103 encodes the dynamic scene graph acquired from the preprocessing unit 102 to create a dynamic scene description (step S104). Then, the encoding unit 103 outputs the data of the bit stream and the data of the static scene description and the dynamic scene description to the file generation unit 104.

The file generation unit 104 generates a segment file of the bit stream from the data of the bit stream. In addition, the file generation unit 104 generates the segment file of the static scene description and the segment file of the dynamic scene description from the data of the static scene description and the data of the dynamic scene description (step S105). Then, the file generation unit 104 outputs the generated segment file to the transmission unit 105.

The transmission unit 105 acquires the segment file transmitted from the file generation unit 104, and transmits and uploads the segment file to the WEB server (step S106).

[Reproduction Processing Procedure According to First Embodiment]

Figure 10:
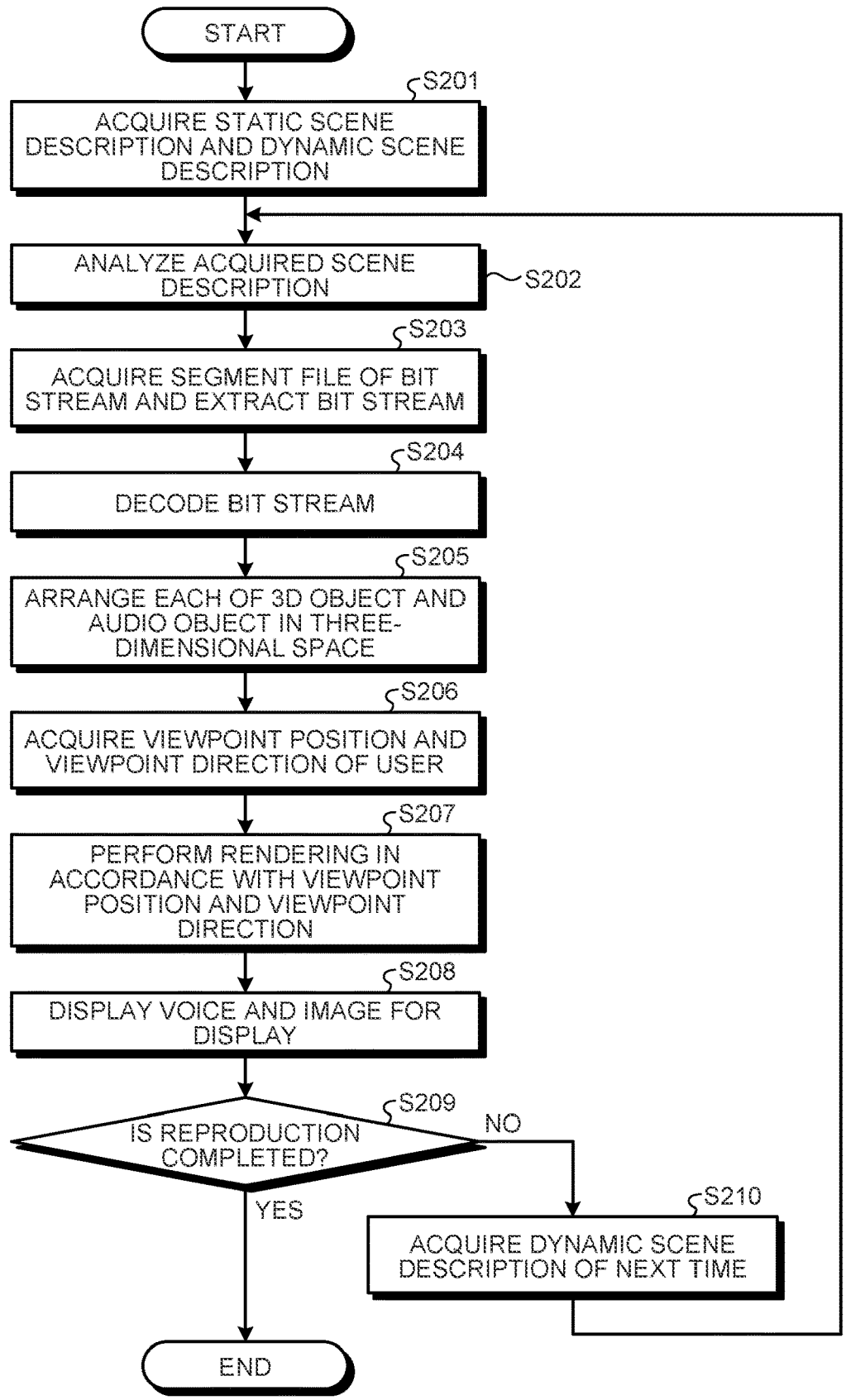
FIG. 10 is a flowchart of reproduction processing executed by the client device according to the first embodiment.

Next, a flow of reproduction processing executed by the client device 2 according to the present embodiment will be described with reference to FIG. 10. FIG. 10 is a flowchart of reproduction processing executed by the client device according to the first embodiment.

The file acquisition unit 206 acquires the static scene description of the 6DoFAV object to be reproduced from a WEB server 4. The static scene description is output to the file processing unit 205 and parsed, and access information of the dynamic scene description is acquired and transmitted to the file acquisition unit 206. The file acquisition unit 206 acquires the dynamic scene description from the WEB server 4 (step S201). Then, the file acquisition unit 206 outputs the acquired dynamic scene description to the file processing unit 205.

The file processing unit 205 parses and analyzes the static scene description and the dynamic scene description acquired from the file acquisition unit 206 (step S202). As a result, the file processing unit 205 acquires the coordinate transformation information of the audio scene and the video scene, the access information of the bit stream segment file, and the space control information of the video scene.

Next, the file processing unit 205 acquires the measurement result of the transmission band of the transmission path from the measurement unit 207. Then, the file processing unit 205 selects a bit stream by using the transmission band of the transmission path and the access information. After that, the file processing unit 205 outputs the access information of the segment file of the selected bit stream to the file acquisition unit 206. The file acquisition unit 206 acquires the segment file of the bit stream selected by the file processing unit 205 from the WEB server. After that, the file acquisition unit 206 outputs the acquired segment file of the bit stream to the file processing unit 205. The file processing unit 205 extracts a bit stream from the segment file of the bit stream acquired from the file acquisition unit 206 and outputs the bit stream to the decoding processing unit 204 (step S203). In addition, the file processing unit 205 outputs the space control information of the video scene to the display information generation unit 203.

The decoding processing unit 204 decodes the bit stream acquired from the file processing unit 205 (step S204). The decoding processing unit 204 outputs the decoded bit stream to the display information generation unit 203. Audio object metadata including audio object data, arrangement information, and the like is stored in the audio bit stream. Therefore, the decoding processing unit 204 also acquires the arrangement position of each audio object by decoding the audio bit stream. The decoding processing unit 204 also outputs information of the arrangement position of the audio object to the display information generation unit 203.

The display information generation unit 203 arranges each of the 3D model data and the audio object in the three-dimensional space using the arrangement position and the coordinate transformation information with respect to the bit stream acquired from the decoding processing unit 204 (step S205).

Next, the display information generation unit 203 acquires the viewpoint position information and the line-of-sight direction information from the display control unit 202 (step S206).

Then, the display information generation unit 203 performs rendering of each of the 3D model data and the audio object arranged in the three-dimensional space according to the viewpoint position information and the line-of-sight direction information to generate voice and an image for display (step S207). After that, the display information generation unit 203 outputs the generated voice and image for display to the display unit 201.

The display unit 201 displays the image for display acquired from the display information generation unit 203 on a display device such as a monitor (step S208).

After that, the control unit 21 determines whether or not the reproduction of the 6DoFAV content is completed (step S209).

In a case where the reproduction is not completed (step S209: No), the control unit 21 instructs the file acquisition unit 206 to acquire the dynamic scene description of the next time. In response to the instruction from the control unit 21, the file acquisition unit 206 acquires the dynamic scene description of the next time from the WEB server (step S210). After that, the reproduction processing returns to step S202.

On the other hand, when the reproduction is completed (step S209: Yes), the control unit 11 gives notification of the end of the file generation by the generation processing unit 10. The generation processing unit 10 ends the file generation upon receiving the notification from the control unit 11.

Here, in the present embodiment, the case of acquiring all the pieces of dynamic information for each time has been described. However, even in a configuration in which the difference for each time is acquired and all the pieces of dynamic information are acquired for each random access point, the function described in the present embodiment can be applied. In this case, the client device acquires the dynamic scene description corresponding to the difference at a time other than the random access point. In addition, the client device acquires the dynamic scene description in which the entire scene included in the dynamic scene description is signaled at the random access point.

As described above, the file generation device according to the present embodiment associates the coordinate transformation information and the access information of the audio scene and the video scene with other information as different scene descriptions. The coordinate transformation information and the access information of the audio scene and the video scene are static information that remains unchanged even after time elapses. On the other hand, information other than the coordinate transformation information and the access information of the audio scene and the video scene also includes dynamic information. Therefore, the coordinate transformation information and the access information of the audio scene and the video scene are acquired once, and information other than the coordinate transformation information and the access information of the audio scene and the video scene is acquired according to the lapse of time. Thus, the 6DoFAV content can be reproduced. Therefore, it is possible to improve the transmission efficiency by reducing the amount of data acquired from the WEB server at the time of reproducing 6DoFAV content, and it is possible to shorten the data reception time by effectively using the transmission band of the network and to shorten the entire processing time of the reproduction processing.

In addition, in the present embodiment, it is possible to independently access a bit stream of audio that is an audio scene and a dynamic scene description that is a video scene from the static scene description, and it is possible to independently adaptively distribute the audio scene or the video scene. That is, when either one is adaptively distributed for each scene, the other scene is not affected. As a result, application distribution can be easily performed, and flexibility of application distribution can be improved.

[Modification (1) of First Embodiment]

The file generation device 1 according to the present modification is different from that of the embodiment 1 in generating a static scene description including static information of a video scene in addition to information included in the static scene graph of the first embodiment. The file generation device 1 according to the present modification is also illustrated in the block diagram of FIG. 5.

Based on the metadata input from the data input unit 101, the preprocessing unit 102 generates a static scene graph from the coordinate transformation information of the audio scene and the video scene, the access information directly connected to the coordinate transformation information, and the scene graph that does not change with time among the scene graphs of the 3D model data. Furthermore, a dynamic scene graph is generated from a scene graph obtained by removing information that does not change with time from the scene graphs of the 3D model data. Then, the preprocessing unit 102 outputs the generated two scene graphs to the encoding unit 103.

The encoding unit 103 acquires the static scene graph and the dynamic scene graph from the preprocessing unit 102. FIG. 11 is a diagram illustrating each scene description generated according to a modification (1) of the first embodiment. The encoding unit 103 encodes the static scene graph to generate a static scene description 341 illustrated in FIG. 11. In addition, the encoding unit 103 encodes the dynamic scene graph to generate a dynamic scene description 342.

Here, the encoding unit 103 generates a Group node 344 as a route in the dynamic scene description 342, and arranges the Transform nodes 310 and 315 as child nodes of the Group node 344. In addition, the encoding unit 103 generates an Inline node 343 including access information to the Group node 344 of the dynamic scene description 332 from the static scene description 341.

Then, the encoding unit 103 outputs the data of the static scene description 341 and the data of the dynamic scene description 342 to the file generation unit 104.

As described above, the encoding unit 103 individually generates the static scene description 341 including the video scene information of only the audio scene and the 3D model data that is not transformed with time, and the dynamic scene description 342 including the dynamic video scene that changes with time. After that, the encoding unit 103 outputs the static scene description 341 and the dynamic scene description 342 to the file generation unit 104.

In this case, in a case where the static scene configuration information includes the scene configuration information of the moving image, the file generation unit 104 separately creates a first file having a format that specifies the configuration information for each time when the scene configuration information of the moving image is stored and a second file having a format that stores information other than the scene configuration information of the moving image. That is, the file generation unit 104 can store the static scene description 341 and the dynamic scene description 342 in the ISOBMFF by a method similar to that of the first embodiment.

As described above, the file generation device according to the present embodiment individually generates the static scene descriptions from the coordinate transformation information of the audio scene and the video scene and the access information directly connected to the coordinate transformation information, and the information that does not change with time from the scene graphs of the 3D model data, and the dynamic scene descriptions from the information other than the information that does not change with time from the scene graphs of the 3D model data. In this case, as compared with the first embodiment, the data included in the static scene description increases, and the data included in the dynamic scene description decreases. Therefore, the amount of data completed in one acquisition can be increased, the amount of data acquired according to the time can be reduced, and the transmission efficiency can be further improved.

[Modification (2) of First Embodiment]

The file generation device 1 according to the present modification is different from the modification (1) of the first embodiment in that the coordinate transformation information of the audio scene and the video scene and the access information directly connected to the coordinate transformation information, and information that does not change with time among metadata of 3D model data are generated as different static scene descriptions. The file generation device 1 according to the present modification is also illustrated in the block diagram of FIG. 5.

The preprocessing unit 102 generates three scene graphs including a static scene graph of the coordinate transformation information of the audio scene and the video scene and the access information directly connected to the coordinate transformation information, a static video scene graph of information that does not change with time from the scene graphs of the 3D model data, and a dynamic video scene graph other than information that does not change with time from the scene graphs of the 3D model data. Then, the preprocessing unit 102 outputs the generated three scene graphs to the encoding unit 103.

Figure 12:
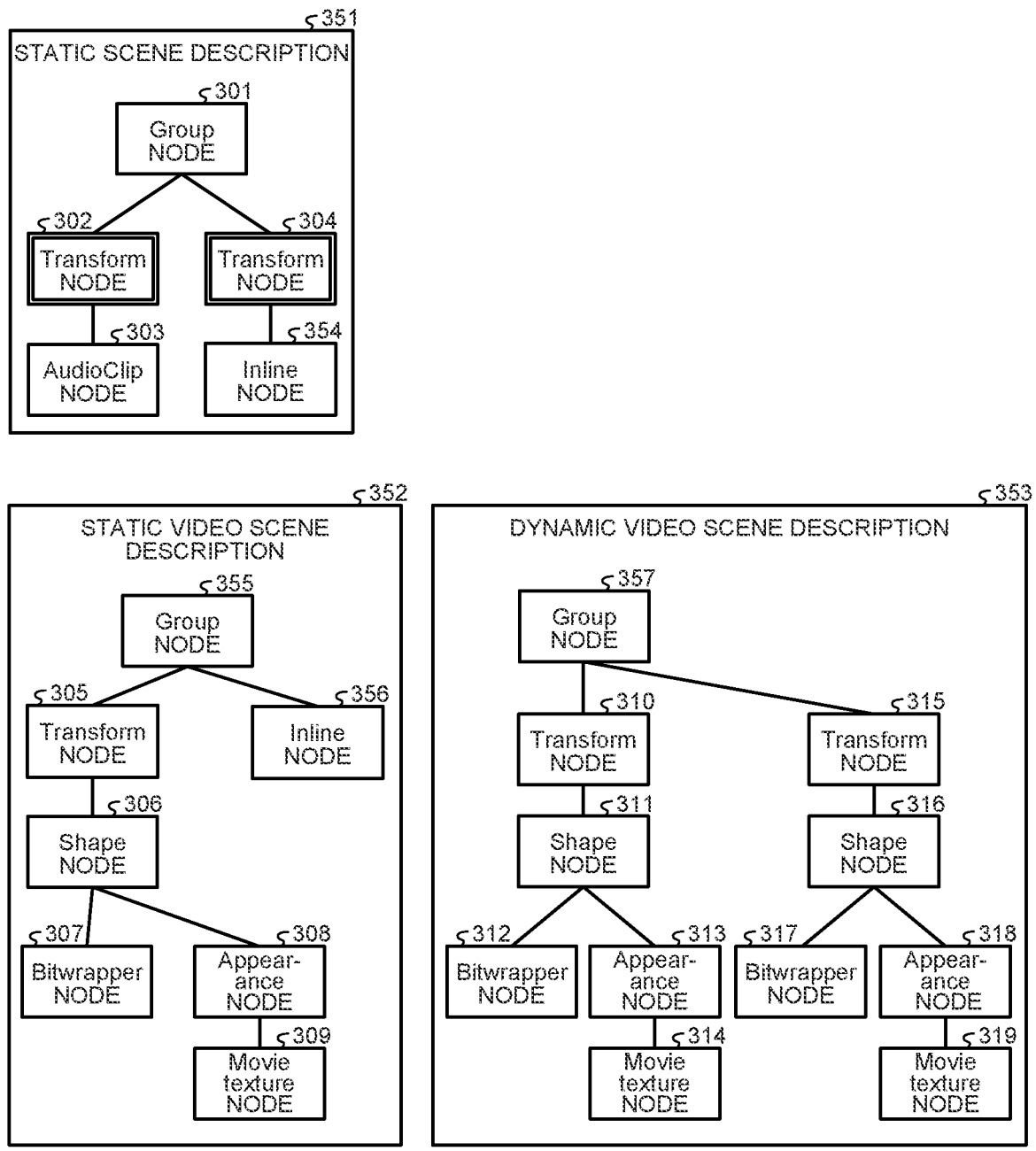
FIG. 12 is a diagram illustrating a scene description generated according to a modification (2) of the first embodiment.

The encoding unit 103 acquires the static scene graph, the static video scene graph, and the dynamic video scene graph from the preprocessing unit 102. Then, the encoding unit 103 encodes the static scene graph to generate a static scene description 351 illustrated in FIG. 12. FIG. 12 is a diagram illustrating a scene description generated according to a modification (2) of the first embodiment.

In addition, the encoding unit 103 encodes the static video scene graph to generate a static video scene description 352. Further, the encoding unit 103 encodes the dynamic video scene graph to generate a dynamic video scene description 353.

Here, the encoding unit 103 generates a Group node 357 as a route in the dynamic video scene description 353, and arranges the transform nodes 310 and 315 as child nodes of the Group node 357. In addition, the encoding unit 103 generates a Group node 355 as a route in the static video scene description 352, and arranges the Transform node 305 as a child node of the Group node 355. Further, the encoding unit 103 generates an Inline node 356 including access information from the static video scene description 352 to the Group node 357 of the dynamic video scene description 353 as a child node of the Group node 355. In addition, the encoding unit 103 generates an Inline node 354 including access information to the Group node 355 of the static video scene description 352 from the static scene description 351.

Then, the encoding unit 103 outputs the data of the static scene description 351, the static video scene description 352, and the dynamic video scene description 353 to the file generation unit 104.

As described above, the encoding unit 103 individually generates the static scene description 351 of the coordinate transformation information of the audio scene and the video scene and the access information directly connected to the coordinate transformation information, the static video scene description 352 of the information that does not change with time from the scene graphs of the 3D model data, and the dynamic video scene description 342 other than the information that does not change with time from the scene graphs of the 3D model data. After that, the encoding unit 103 outputs the static scene description 351, the static video scene description 352, and the dynamic video scene description 353 to the file generation unit 104.

In this case, the file generation unit 104 can store the static scene description 351, the static video scene description 352, and the dynamic video scene description 353 in ISOBFF in the similar manner as in the first embodiment. In this case, in the file of ISOBBFF of the static video scene description 352, all times are expressed by one scene description.

As described above, the file generation device according to the present embodiment individually generates the static scene description of the coordinate transformation information of the audio scene and the video scene and the access information directly connected to the coordinate transformation information, the static video scene description of the information that does not change with time from the scene graphs of the 3D model data, and the dynamic video scene description other than the information that does not change with time from the scene graphs of the 3D model data. Also in this case, as compared with the first embodiment, the static information of the video scene becomes the static video scene description and can be completed by one acquisition. Therefore, the amount of data can be reduced and the transmission efficiency can be improved as compared with the first embodiment. In addition, in this case, although the number of scene descriptions increases, it is possible to adaptively distribute the video scene and the audio scene independently, which is possible in the first embodiment and not possible in the modification (1) of the first embodiment.

[Modification (3) of First Embodiment]

Figure 13:
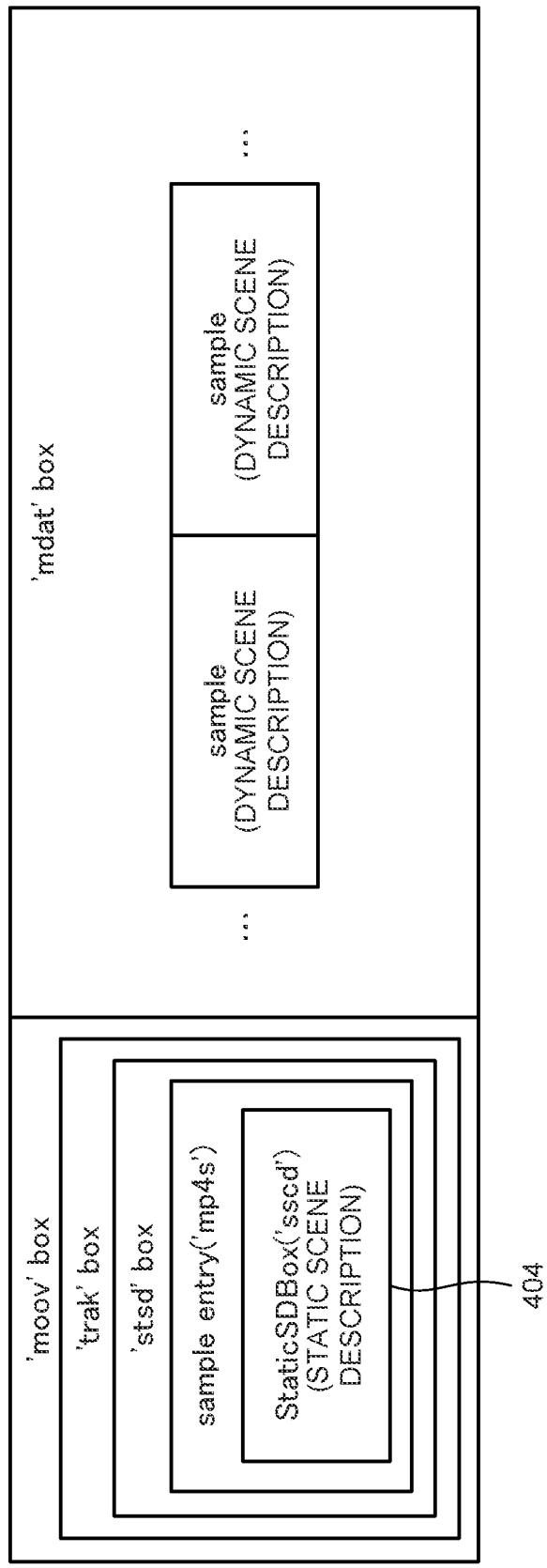
FIG. 13 is a diagram illustrating an example of a storage state in a case where each scene description is stored in one ISOBMFF.

The file generation device 1 according to the present modification is different from the first embodiment in that the static scene description and the dynamic scene description are stored in one file of the ISOBMFF. The file generation device 1 according to the present modification is also illustrated in the block diagram of FIG. 5. FIG. 13 is a diagram illustrating an example of a storage state in a case where each scene description is stored in one ISOBMFF.

The file generation unit 104 stores the scene description of the static scene configuration information and the scene description of the dynamic scene configuration information in the same file of the ISOBMFF having a format that specifies the configuration information for each time, and the static scene configuration information is included in the sample entry in the file of the ISOBMFF. Hereinafter, details of the file generation unit 104 according to the present embodiment will be described.

As illustrated in a file 403 of FIG. 13, the file generation unit 104 generates a box 404 that stores a newly defined static scene description in a sample entry. In FIG. 13, the newly defined box 404 is StaticSDBox ('sscd'). Then, the file generation unit 104 stores the static scene description in the newly defined box. FIG. 14 is a diagram illustrating an example of syntax registered in a box that stores a static scene description. The file generation unit 104 stores syntax as illustrated in FIG. 14 in StaticSDBox ('sscd') that is the box 404 in which syntax is newly defined.

In addition, the file generation unit 104 stores the dynamic scene description as a sample in 'mdat' box. In this case, the file generation unit 104 stores, in the Inline node of the static scene description indicating the access information to the dynamic scene description, the access information indicating that the information indicating the dynamic scene description is included in the track to which the static scene description belongs. For example, by describing self-contained in the url field that is the access information of the Inline node, the file generation unit 104 can express that the information indicating the dynamic scene description is included in the sample of the track to which the static scene description belongs. In addition, the file generation unit 104 may add a new self-contained-flag filed to the Inline node, define that the information indicating the dynamic scene description is included in the sample of the track to which the file generation unit 104 itself belongs in a case where the flag is 1, and set the flag to 1.

Similarly, the file generation unit 104 can store the scene description in the ISOBMFF by using the method for storing the scene description in the ISOBMFF in the present embodiment, for the scene description generated in the modification (1) of the first embodiment.

Figure 15:
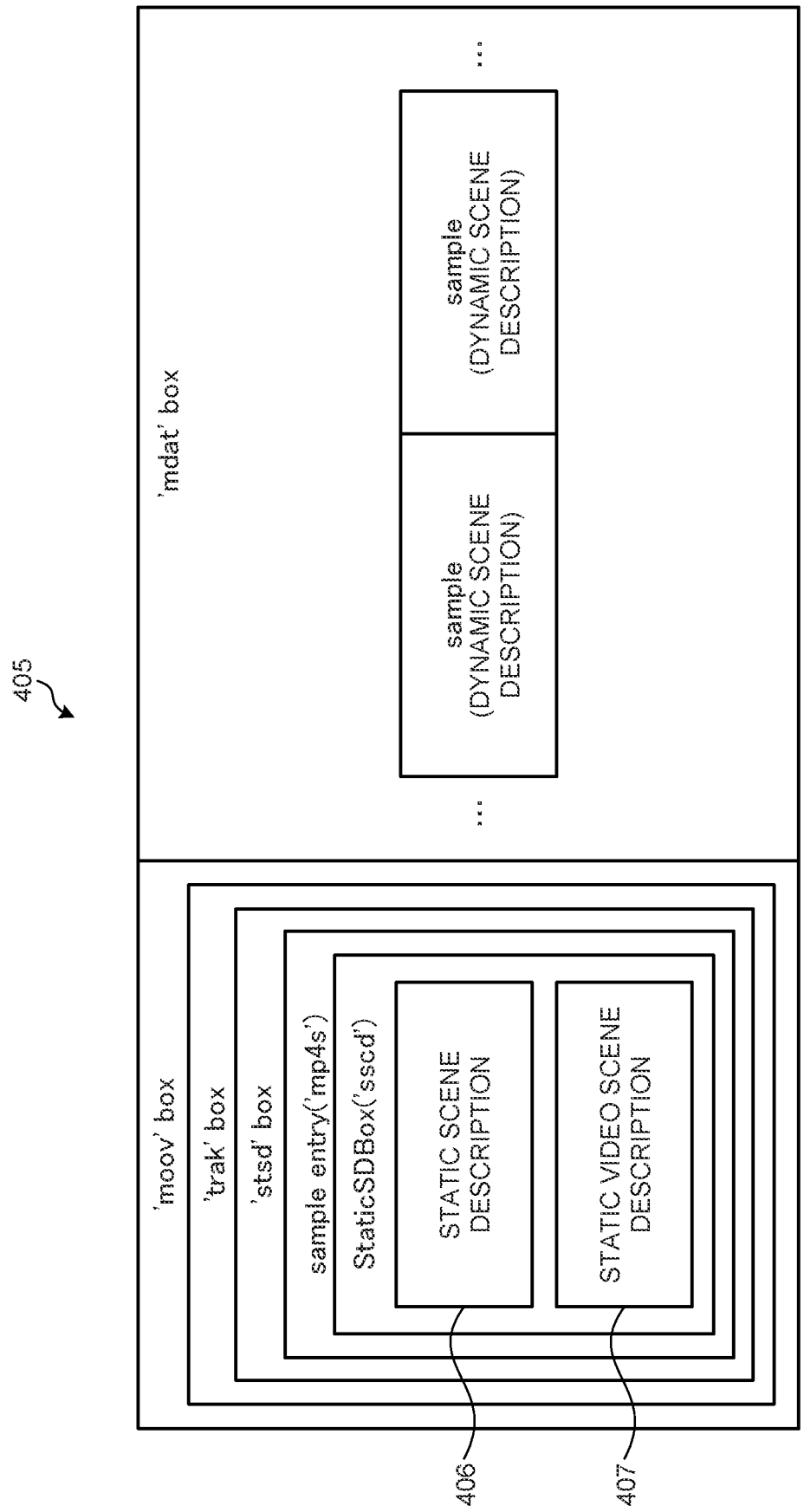
FIG. 15 is a diagram illustrating another example of a storage state in a case where each scene description is stored in one ISOBMFF.

In addition, in the case of a scene description generated in the modification (2) of the first embodiment, the file generation unit 104 generates a file in a manner that a plurality of scene descriptions can be stored in StaticSDBox ('sscd'). FIG. 15 is a diagram illustrating another example of a storage state in a case where each scene description is stored in one ISOBMFF. For example, as illustrated in a file 405 of FIG. 15, the file generation unit 104 includes a static scene description 406 and the static video scene description 407 in StaticSDBox ('sscd'). The static scene description 406 corresponds to the static scene description 351 in FIG. 12. In addition, the static video scene description 407 corresponds to the static video scene description 352 of FIG. 12.

The file generation unit 104 first stores the scene description to be the route. As illustrated in FIG. 15, the file generation unit 104 first stores the static scene description 406 to be the uppermost route of the scene graph. The dynamic scene description is stored in the sample of 'mdat' box. For example, the file generation unit 104 registers the syntax illustrated in FIG. 16 as the static scene description 406 and the static video scene description 407. FIG. 16 is a diagram illustrating another example of syntax registered in a box that stores a static scene description.

In this case, the file generation unit 104 describes, for example, "url="StaticSDBox:2"" in the url field of the Inline node as the access information to the static scene description 407 in the static scene description 406 url="StaticSDBox:2" indicates the scene description stored second in StaticSDBox.

However, although the scene description 406 to be the route is always arranged first here, a method for indicating the scene description to be the route may be another method. For example, the file generation unit 104 may explicitly indicate the selection order by adding a root-flag field before the SD_size field in the syntax illustrated in FIG. 16 in StaticSDBox'sscd'. For example, in a case where the value of the root-flag field is 1, it is assumed that the file generation unit 104 expresses that the static scene description is a scene description of a route that should be processed first.

In addition, in the case of the scene description generated in the modification (2) of the first embodiment, the scene description can be stored in the ISOBMFF by another method. For example, the file generation unit 104 stores the static video scene description and the dynamic video scene description that constitute the scene description of the video scene in the same file of the ISOBMFFF, and stores the static scene description in another file. Hereinafter, details of the file generation unit 104 according to the present embodiment will be described.

FIG. 17 is a diagram illustrating another example of a storage state in a case where each scene description is stored in a different ISOBMFF. As illustrated in FIG. 17, the file generation unit 104 may separately generate an ISOBMFF file 408 including a static scene description 411 and an ISOBMFF file 409 including a static video scene description 412.

Syntax for StaticSDBox ('sscd') in this case is similar to the syntax illustrated in FIG. 16. From the static scene description 411, URL information of the file 409 is put into the url field that is access information of the Inline node indicating access to the static video scene description 412. In addition, the access information from the static video scene description 412 to the dynamic scene description signals self-contained to the url field described above, and indicates the track to which the access information belongs.

As described above, by storing the static scene description 411 and the static video scene description 412 in different ISOBMFF files, it is possible to access the audio scene and the video scene individually. As a result, it is possible to individually adaptively distribute the audio scene and the video scene. However, the file of the ISOBMFF of the static scene description 411 needs to have a data size for storing management information and the like used in the ISOBMFF.

As described above, the file generation device according to the present embodiment stores a static scene description and a dynamic scene description in one file of the ISOBMFF. As a result, when one file is acquired, the static and dynamic scene descriptions can be read, and the number of times of acquisition of the static scene descriptions may be one. Then, when the information of the static scene description is acquired by the method according to the present embodiment, the amount of data to be acquired can be reduced as compared with the case of the first embodiment.

[Modification (4) of First Embodiment]

Figure 18:
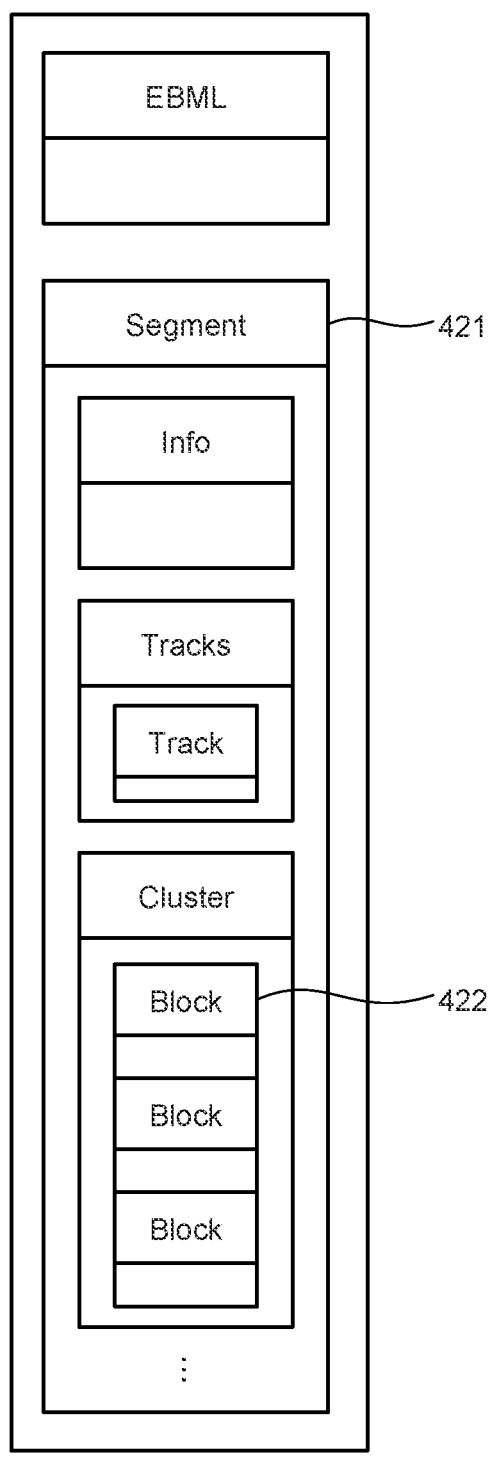
FIG. 18 is a diagram illustrating a format of Matroscka Media Container.

The file generation device 1 according to the present modification is different from the first embodiment in using Matroska Media Container instead of the ISOBMFF as a file format of a file that stores scene descriptions. The file generation device 1 according to the present modification is also illustrated in the block diagram of FIG. 5. FIG. 18 is a diagram illustrating a format of Matroscka Media Container.

In this case, the file generation unit 104 newly defines StaticSD element and stores the information to be stored in the sample entry of the ISOBMFF when the scene description is stored in the file of the ISOBMFF in the Track Type Entry element indicated by a box 421. Then, the file generation unit 104 stores information to be stored in the sample in a case where the scene description is stored in the file of the ISOBMFF as Block data indicated by a box 422. Information stored in the sample in a case where the scene description is stored in the ISOBMFF file is, for example, information of the dynamic scene description.

For example, when static information and dynamic information are transferred in the same file, the information of the static scene description is stored as binary data in StaticSD-Box ('sscd') newly defined in the Track Entry element.

As described above, the file generation device according to the present modification stores the scene description in the file of Matroska Media Container. As described above, the file generation device can use not only the ISOBMFF but also a format such as Matroska Media Container as a format of a file that stores a scene description.

[Modification (5) of First Embodiment]

Figure 19:
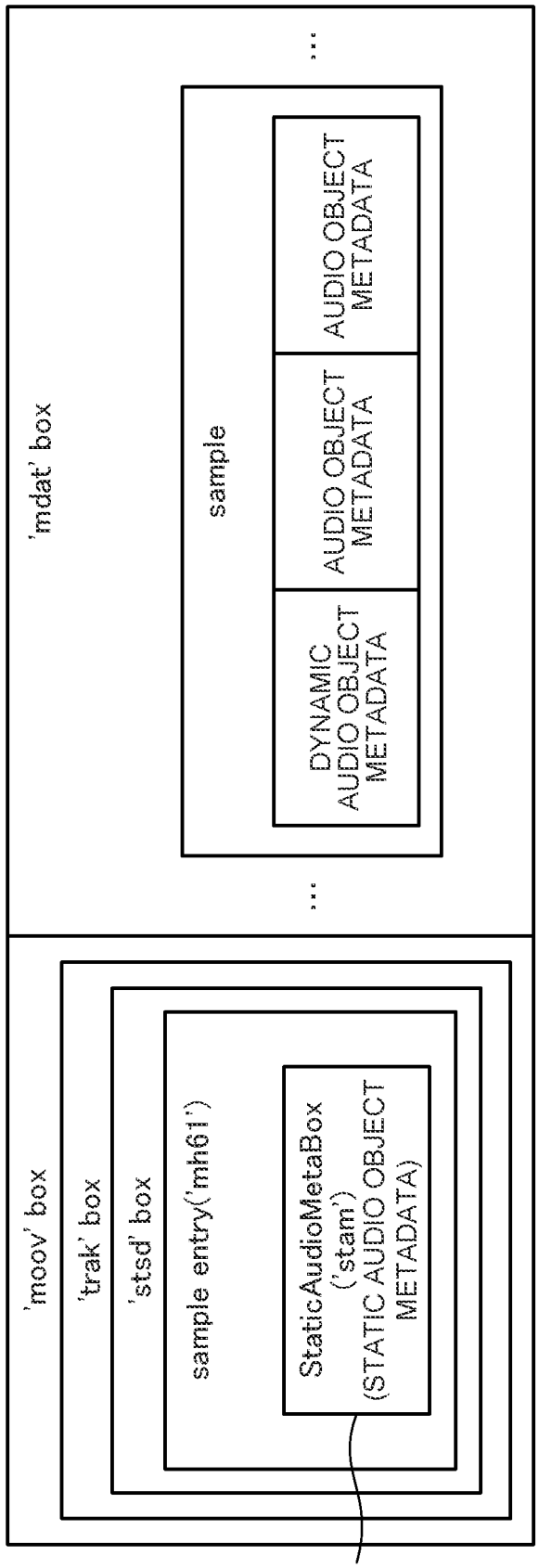
FIG. 19 is a diagram illustrating a file of ISOBFMM that stores the audio bit stream.

Also in the audio object, dynamic arrangement information of which position changes by time and static arrangement information that does not always move are mixed. Therefore, the file generation device according to the present modification generates and stores the dynamic audio object metadata and the static audio object metadata from the arrangement information of the audio object. FIG. 19 is a diagram illustrating a file of ISOBFMM that stores the audio bit stream.

The audio bit stream includes audio object metadata that is metadata of arrangement information of the audio object and audio object data that is encoded object data. Therefore, in a case where the audio bit stream is stored in the ISOBMFF, for example, as illustrated in a box 431 in a file 430 of FIG. 19, codingname'mh61' of the sample entry is newly defined, and the bit stream is stored in the sample.

The preprocessing unit 102 generates arrangement information of the audio object separately for static audio object metadata that is static arrangement information and dynamic audio object metadata that is dynamic arrangement information. The encoding unit 103 encodes the static audio object metadata and the dynamic audio object metadata generated by the preprocessing unit 102, and outputs the encoded data to the file generation unit 104.

The file generation unit 104 includes the static scene configuration information in the audio scene configuration information in the sample entry that is management information in the file of the ISOBMFF. That is, the file generation unit 104 stores the static audio object metadata in StaticAudioMetaBox that is the sample entry of newly defined sample entry ('mh61') indicated by the box 431. In addition, the file generation unit 104 stores the dynamic audio object metadata in the sample of 'mdat'box. Information expressing which audio object data corresponds to arrangement information is registered in StaticAudioMetaBox. That is, the object metadata not stored in StaticAudioMetaBox is included in the dynamic audio object metadata.

For example, the file generation unit 104 registers the syntax illustrated in FIG. 20 as the static audio object metadata. FIG. 20 is a diagram illustrating an example of syntax registered in a box that stores static audio object metadata. Here, in the syntax illustrated in FIG. 20, the static audio objects included in StaticAudioMetaBox are identified using an Identifier (ID), but the static audio objects included in the bit stream may be indicated in order.

As described above, the file generation device according to the present modification generates the arrangement information of the audio object separately for the dynamic information and the static information, and stores the generated arrangement information in the ISOBMFF. As a result, regarding the audio object, the static information is completed by one reception, and the audio object can be reproduced by receiving the dynamic information repeatedly. Therefore, the transmission efficiency of the audio content can also be improved.

[Modification (6) of First Embodiment]

Figure 21:
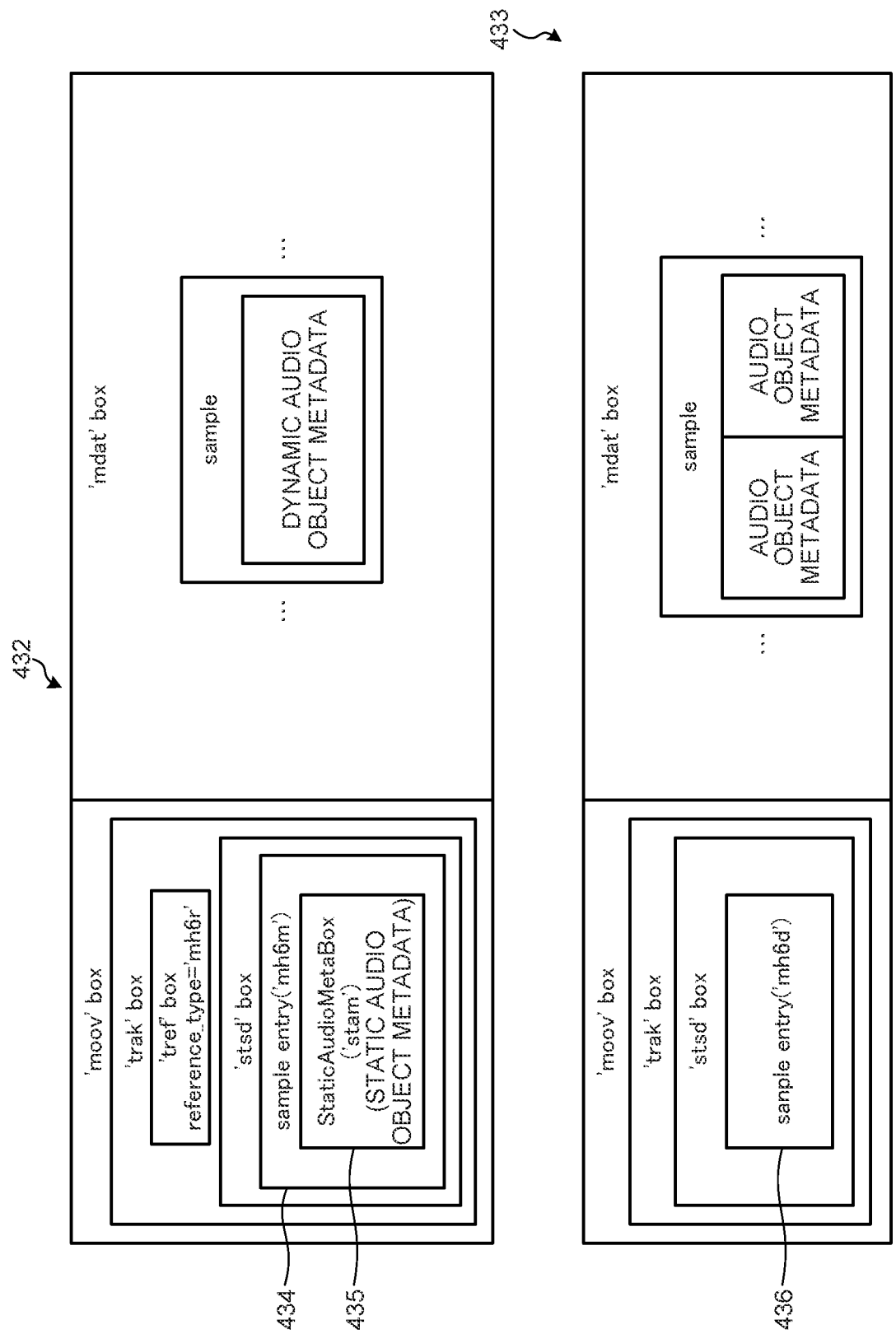
FIG. 21 is a diagram illustrating an example of separate storage of audio object metadata in the ISOBMFF.

The file generation device 1 according to the present modification is different from the modification (5) in that audio object metadata and audio object data are stored in different ISOBMFF and transmitted. The file generation device 1 according to the present modification is also illustrated in the block diagram of FIG. 5. FIG. 21 is a diagram illustrating an example of separate storage of audio object metadata in the ISOBMFF.

When storing the bit stream of the audio object metadata in the ISOBMFF, the file generation unit 104 stores the bit stream as illustrated in a file 432. That is, as indicated by a box 434, the file generation unit 104 designates 'mh6m' indicating that it is a bit stream of audio object metadata in the sample entry and enables identification. In addition, the file generation unit 104 stores StaticAudioMetaBox indicated by a box 435 expressing static audio object metadata in the Sample entry, and stores dynamic audio object metadata in the sample of 'mdat'box.

Further, the file generation unit 104 uses reference type'mh6r' in 'tref'box of the file 432 to indicate track_id of a file 433 of the ISOBMFF of the audio object data as the access information to the audio object data. As a result, the file generation unit 104 associates the audio object metadata with the audio object data.

In addition, in a case where a bit stream of only audio object data is stored in the ISOBMFF, the bit stream is stored as illustrated in the file 433. That is, as indicated by a box 436, the file generation unit 104 designates 'mh6d' indicating that it is a bit stream of only audio object data in the sample entry and enables identification. Then, the file generation unit 104 stores the audio object data in 'mdat' box as a sample.

In this case, the file generation unit 104 uses information indicating the file of the ISOBMM of the audio object metadata as the access information to the audio bit stream of the static scene description.

As described above, the file generation device according to the present modification stores the audio object metadata and the audio object in different ISOBMFF files. As a result, for example, in a case where a plurality of bit rate variations is prepared in the audio object data, the audio object metadata can be common. In this case, the client device does not need to simultaneously switch the audio object metadata by switching the bit rate in the adaptive distribution and can improve the processing efficiency at the time of distribution. In addition, in the content authoring, as processing in the case of correcting the audio object metadata, it is sufficient to correct the bit stream of the common audio metadata, and the processing efficiency at the time of correcting the audio object is improved.

In addition, in the above description, the case of using the ISOBMFF as the file format has been described, but Matroska Media Container may be used. In this case, codingname uses CodecID and CodecName of the Track Entry element, and the information of the track reference is stored in the Track Operation element included in the Track Entry element by newly creating the AudioObjectDataRederence element. The static audio object metadata newly creates a StaticAudioMeta element in the Track Entry element. At this time, the element type is Binary, and as EBML data, StaticAudioMetaBox ('Stam') is stored as binary data.

Second Embodiment

The file generation device 1 according to the present embodiment is different from the first embodiment in that the access information to the audio scene and the video scene and the coordinate transformation information for performing position synchronization between the audio scene and the video scene, which are included in the static scene description of the first embodiment, are stored in an MPD file. The file generation device 1 according to the present embodiment is also illustrated in the block diagram of FIG. 5. In the following description, description of the functions of the units similar to those of the first embodiment will be omitted.

In this case, the preprocessing unit 102 generates a video scene graph that is arrangement information of the 3D model data as dynamic scene configuration information.

Figure 22:
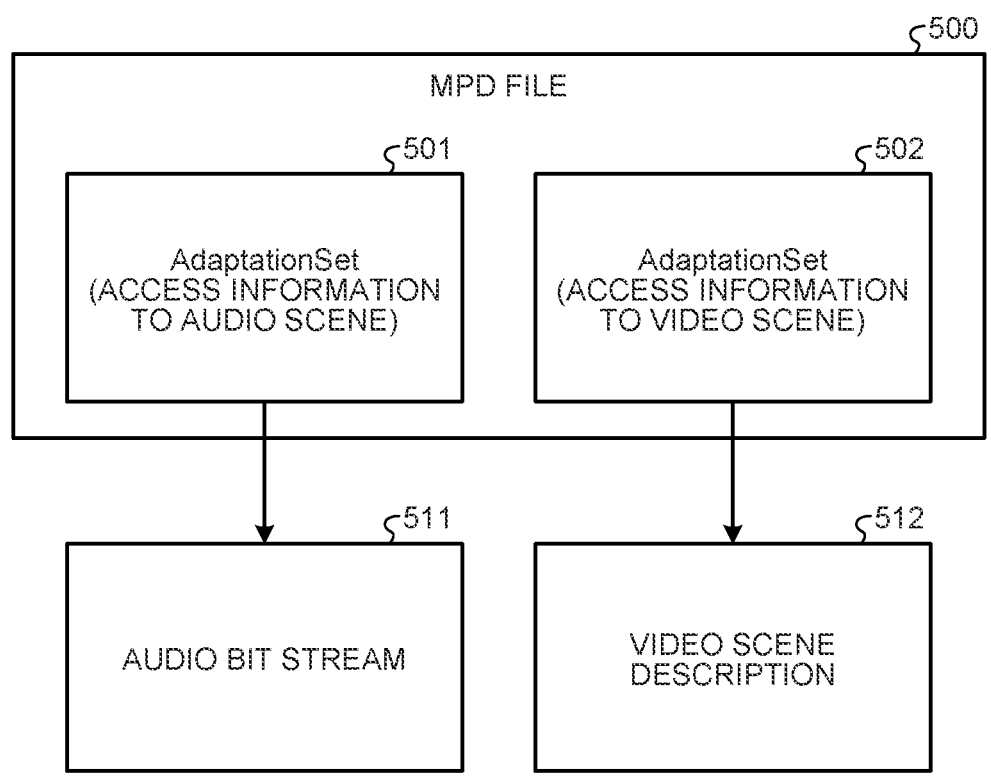
FIG. 22 is a diagram illustrating an example of storage of access information to an audio scene and a video scene in an MPD.

The file generation unit 104 stores the access information to the audio scene and the access information to the video scene in different AdaptationSet as illustrated in an MPD file 500 of FIG. 22. FIG. 22 is a diagram illustrating an example of storage of access information to an audio scene and a video scene in an MPD. The MPD file 500 includes an audio scene AdaptationSet 501 and a video scene AdaptationSet 502. The audio scene AdaptationSet 501 holds access information to an audio bit stream 511. In addition, the video scene AdaptationSet 502 holds access information to the scene description of the video. As a result, the MPD file 500 can indicate the respective access information to the audio scene and the video scene.

In addition, the file generation unit 104 stores the coordinate transformation information for extending the MPD and performing position synchronization between the audio scene and the video scene in the MPD file 500. Specifically, the file generation unit 104 stores the coordinate transformation information of each of the audio scene AdaptationSet 501 and the video scene AdaptationSet 502 in the MPD file 500.

For example, a new descriptor indicating the coordinate transformation information is defined as illustrated in FIG. 23. FIG. 23 is a diagram illustrating an example of a descriptor of coordinate transformation information. As illustrated in FIG. 23, translation, rotation, and enlargement in the three-dimensional coordinate system are defined by these descriptors.

FIG. 24 is a diagram illustrating a description example of syntax using the descriptor of the coordinate transformation information. For example, "SceneTransform" is designated as SchemeIdURI in Supplemental Property. Further, the coordinate transformation information is designated by the element. In the syntax illustrated in FIG. 24, coordinate transformation is executed to translate 10 in the x-axis direction and double the value of z. The file generation unit 104 stores the coordinate transformation information in the MPD file 500 using syntax as illustrated in FIG. 24. However, the syntax in FIG. 24 is an example, and for example, the coordinate transformation can be expressed by other methods such as expression using a transformation matrix.

As described above, the file generation device according to the present embodiment stores the access information to the audio scene and the video scene and the coordinate transformation information for performing position synchronization between the audio scene and the video scene in an MPD file. As a result, notification of the minimum information is given in the MPD as the access information to the audio scene and the video scene and the coordinate transformation information for performing position synchronization between the audio scene and the video scene. Therefore, the amount of data transmitted to the client device can be reduced. In addition, in a case where there is a plurality of bit streams for adaptive distribution of an audio scene and a video scene, the coordinate transformation information stored in the MPD file is adapted with respect to any of the bit streams. Therefore, in a case where the value related to the coordinate transformation is corrected, it is possible to cope with it by the correction of the coordinate transformation information described in the MPD file, and the processing efficiency of the data management can be improved.

[Modification (1) of Second Embodiment]

The file generation device 1 according to the present modification generates the coordinate transformation information included in the static scene configuration information as an ISOBMFF file having a format that specifies the configuration information for each time. That is, the present modification is different from the second embodiment in that the coordinate transformation information of the audio scene and the video scene is stored in a file of the ISOBMFF. The file generation device 1 according to the present modification is also illustrated in the block diagram of FIG. 5.

The file generation unit 104 stores SceneTransformBox illustrated in FIG. 25 in the audio bit stream 511 and a video scene description 512 illustrated in FIG. 22. FIG. 25 is a diagram of an example of syntax illustrating coordinate transformation information stored in the ISOBMFF. As a result, the client device 2 can acquire the coordinate transformation information by acquiring the audio bit stream 511 and the video scene description 512.

In the case of the audio bit stream 511, the file generation unit 104 stores SceneTransformBox in, for example, the sample entry including the box 431 in the file 430 of FIG. 19. In addition, in the case of the scene description of the video, the file generation unit 104 stores SceneTransformBox in, for example, the sample entry of the dynamic scene description in the file 402 of FIG. 7. Here, the syntax of FIG. 22 is an example, and the coordinate transformation information may be expressed by another method such as using a transformation matrix, for example, as long as the coordinate transformation information can be expressed.

As described above, the file generation device according to the present modification stores syntax indicating coordinate transformation information in the file of the ISOBMFF. In this case, since minimum information is transmitted as the coordinate transformation information to the client device, the amount of data to be transmitted can be reduced.

In addition, here, the case where ISOBMFF is used as the file format has been described, but Matroska Media Container may be used. In this case, the syntax of the coordinate transformation is stored in the newly created SceneTransfrom element in the Track Entry element. At this time, ElementType is Binary, and as EBML data, SceneTransformBox ('sctr') is stored as binary data.

[Modification (2) of Second Embodiment]

In the present modification, the coordinate transformation information is stored in both the MPD and the ISOBMFF. The file generation device 1 according to the present modification is also illustrated in the block diagram of FIG. 5.

The file generation unit 104 includes the coordinate transformation information included in the static scene configuration information in the control information, stores the coordinate transformation information in a file having a format that specifies the configuration information for each time, and generates priority information of the coordinate transformation information included in the control information and the coordinate transformation information stored in the file. Specifically, the file generation unit 104 stores the coordinate transformation information in the MPD file 500 similarly to the second embodiment. In addition, the file generation unit 104 stores the coordinate transformation information in the audio bit stream 511 and the video scene description 512, similarly to the modification (2) of the second embodiment.

When the coordinate transformation information is stored in both the MPD file and the ISOBMFF file, the following four procedures exist for the coordinate transformation. (1) The value of the file of the ISOBMFF is ignored, and the value of the MPD file is prioritized. (2) The value of the MPD file is ignored, and the value of the file of the ISOBMFF is prioritized. (3) Both values are used. That is, the coordinate transformation is performed twice. (4) Either value may be used. However, in the case of (4), it is assumed that the same value is provided from any file.

Therefore, the file generation unit 104 adds ST@TransformPriority attribute to the descriptor illustrated in FIG. 23 and sets any one of (1) to (4). As a result, the client device 2 can check which of the procedures (1) to (4) the coordinate transformation is performed by using the MPD file 500. Here, in the present modification, the descriptor illustrated in FIG. 23 is extended, but the file generation unit 104 may use another Supplemental Property.

As described above, the file generation device according to the present modification stores the coordinate transformation information in both the MPD file and the ISOBMFF file, and notification of the use method is performed. In this way, even if the coordinate transformation information is stored not in either one but in both, the 6DoFAV content can be reproduced. In addition, by clearly indicating the procedure of the coordinate transformation, the administrator can easily determine which one of the file of the ISOBMFF and the MPD file is to be corrected in a case where the coordinate transformation is to be corrected.

[Modification (3) of Second Embodiment]

The file generation device 1 according to the present modification registers the scene type for each AdaptetionSet. The file generation device 1 according to the present modification is also illustrated in the block diagram of FIG. 5.

The file generation unit 104 includes information for identifying each of the voice scene and the moving image scene in the 6DoF content in the MPD file that is the control information. Specifically, the file generation unit 104 registers "SceneType" in SchemeIdURI of Supplemental Property, and sets "audio scene", "video scene", or [audio scene and video scene] as its value. For example, when notifying the audio scene AdaptationSet 501 of "SceneType", the file generation unit 104 adds a sentence <SupplementalProperty SchemeIDUri="SceneType" value="Audio"/>. In addition, information indicating any of "audio scene", "video scene", or [audio scene and video scene] may be registered in @contentType attribute of AdaptationSet. In addition, it is also possible to enable the determination of the scene type with another attribute.

As described above, the file generation device according to the present modification registers the scene type for each AdaptationSet. As a result, it is possible to easily determine which AdaptationSet has the access information to the audio scene and which AdaptationSet has the access information to the scene description of the video among the AdaptationSets included in the MPD file.

[Modification (4) of Second Embodiment]

In the distribution of 6DoFAV content, there is a possibility that a plurality of pieces of 6DoFAV content is distributed in one MPD file. In this case, although there is a plurality of pieces of audio object data and 3D model data, it is difficult to determine which combination is the same 6DoFAV content. Therefore, the file generation device 1 according to the present modification stores information indicating that the data is data of the same 6DoFAV content in AdaptationSet.

The file generation unit 104 includes information that associates the audio scene and the video scene in the 6DoF content in the control information. Specifically, the file generation unit 104 registers "SceneID" in SchemeIdURI of Supplemental Property, and indicates which 6DoFAV content data is the data by the value. That is, if the values of "SceneID" are the same, it indicates that the data is of the same 6DoFAV content.

As described above, the file generation device according to the present modification stores the identification information of the 6DoFAV content to which the data indicated by the access information belongs in AdaptationSet. This makes it possible to distribute a plurality of pieces of 6DoFAV content by using one MPD file.

(Hardware Configuration)

The above-described series of processing can be executed by hardware or software. In a case where the series of processing is executed by software, a program constituting the software is installed in a computer. Here, the computer includes a computer incorporated in dedicated hardware, a general-purpose personal computer capable of executing various functions by installing various programs, and the like, for example.

Figure 26:
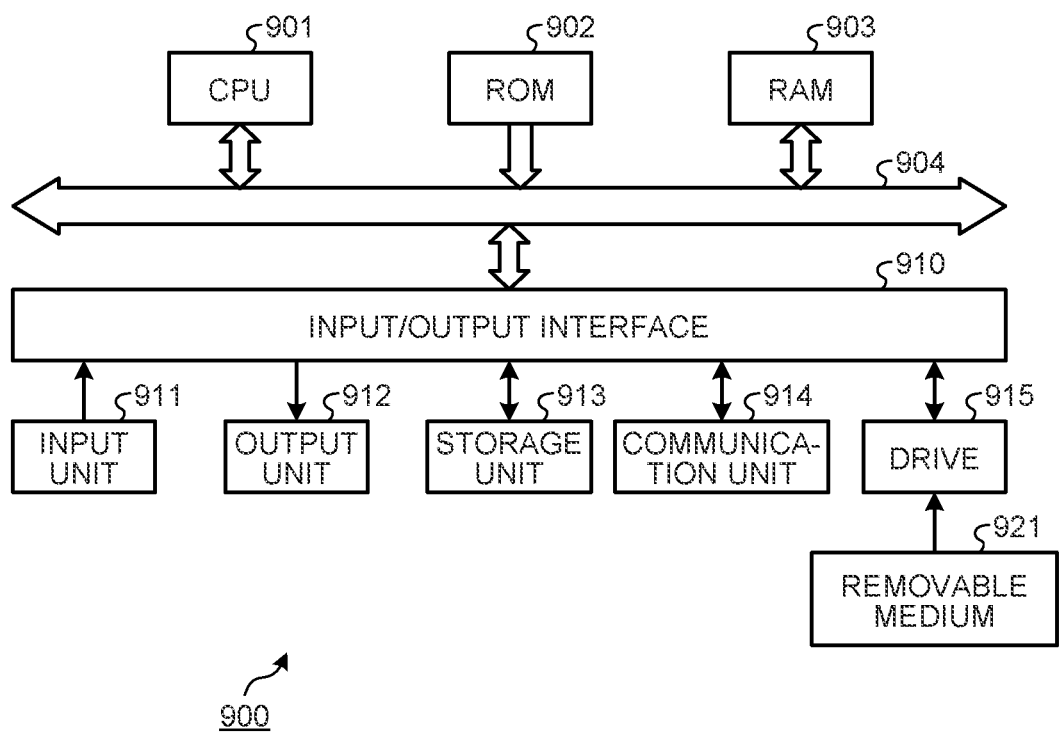
FIG. 26 is a hardware configuration diagram of the file generation device.

FIG. 26 is a hardware configuration diagram of the file generation device. The file generation device 1 is realized by a computer 900 illustrated in FIG. 26. In the computer 900, a central processing unit (CPU) 901, a read only memory (ROM) 902, and a random access memory (RAM) 903 are connected to one another via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable medium 921 such as a magnetic disk, an optical disk, a magneto-optical disk, or a semiconductor memory.

In the computer configured as described above, for example, the CPU 901 loads a program stored in the storage unit 913 into the RAM 903 via the input/output interface 910 and the bus 904 and executes the program. Therefore, the above-described series of processing is performed. The RAM 903 also appropriately stores data and the like necessary for the CPU 901 to execute various processes.

The program executed by the CPU 901 can be applied by being recorded in the removable medium 921 as a package medium and the like, for example. In this case, the program can be installed in the storage unit 913 via the input/output interface 910 by attaching the removable medium 921 to the drive 915.

In addition, this program can also be provided via a wired or wireless transmission medium such as a local area network, the Internet, and digital satellite broadcasting. In this case, the program can be received by the communication unit 914 and installed in the storage unit 913.

In addition, this program can be installed in the ROM 902 or the storage unit 913 in advance.

Although the embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

In addition, the effects of the embodiments described in the present specification are merely examples and are not limited, and other effects may be provided.

Note that the present technology can also have the configuration below.

(1)
An information processing apparatus comprising:
a preprocessing unit that generates, as scene configuration information indicating a configuration of a scene of 6DoF content configured by 3D model data, dynamic scene configuration information that changes over time and static scene configuration information that does not change over time, the static scene configuration information being scene configuration information different from the dynamic scene configuration information.

(2)
The information processing apparatus according to (1), wherein the 6DoF content further includes audio object data.

(3)
The information processing apparatus according to (1), comprising: an encoding unit that individually generates a static scene description based on the static scene configuration information and a dynamic scene description based on the dynamic scene configuration information.

(4)
The information processing apparatus according to (3), comprising: a file generation unit that separately stores the static scene description and the dynamic scene description in different files having a format that specifies configuration information for each time.

(5)
The information processing apparatus according to (3), including: a file generation unit that separately stores the scene description of the static scene configuration information and the scene description of the dynamic scene configuration information in a same file having a format that specifies configuration information for each time, and includes the static scene configuration information in management information in the file.

(6)
The information processing apparatus according to (3), comprising: a file generation unit that, in a case where the static scene configuration information includes scene configuration information of a moving image, separately creates a first file having a format that specifies configuration information for each time when the scene configuration information of the moving image is stored and a second file having the format that stores information other than the scene configuration information of the moving image.

(7)
The information processing apparatus according to (3), comprising: a file generation unit that, in a case where the static scene configuration information includes scene configuration information of a moving image, stores the scene configuration information of the moving image and the dynamic scene configuration information included in the static scene configuration information in a same file having a format that specifies configuration information for each time, and includes the scene configuration information of the moving image included in the static scene configuration information in management information in the file.

(8)
The information processing apparatus according to (3), in which
  the preprocessing unit generates scene configuration information of voice separately for the static scene configuration information and the dynamic scene configuration information, and
  the file generation unit includes the static scene configuration information in the scene configuration information of the voice in management information in a file having a format that specifies configuration information for each time.

(9)
The information processing apparatus according to (1), comprising:
  an encoding unit that generates the dynamic scene configuration information as a scene description; and
  a file generation unit that includes the static scene configuration information in control information of the 6DoF content.

(10)

The information processing apparatus according to (9), wherein the file generation unit includes coordinate transformation information included in the static scene configuration information in the control information.

(11)

The information processing apparatus according to (9), wherein the file generation unit stores coordinate transformation information included in the static scene configuration information in a file having a format that specifies configuration information for each time.

(12)

The information processing apparatus according to (9), wherein the file generation unit includes coordinate transformation information included in the static scene configuration information in the control information, stores the coordinate transformation information in a file having a format that specifies configuration information for each time, and generates priority information of the coordinate transformation information included in the control information and the coordinate transformation information stored in the file.

(13)

The information processing apparatus according to (9), wherein the file generation unit includes, in the control information, information for identifying each of a voice scene and a moving image scene in the 6DoF content.

(14)

The information processing apparatus according to (9), wherein the file generation unit includes, in the control information, information for associating the voice scene and the moving image scene in the 6DoF content.

(15)

A reproduction processing apparatus including:
a display information generation unit that receives, as scene configuration information indicating a configuration of a scene of 6DoF content configured by 3D model data and audio object data in a three-dimensional space, dynamic scene configuration information that changes over time and static scene configuration information that does not change over time, the static scene configuration information being scene configuration information different from the dynamic scene configuration information, and generates display information for reproducing the scene based on the dynamic scene configuration information and the static scene configuration information.

(16)

An information processing method including:
generating, as scene configuration information indicating a configuration of a scene of 6DoF content configured by 3D model data in a three-dimensional space, dynamic scene configuration information that changes over time and static scene configuration information that does not change over time, the static scene configuration information being scene configuration information different from the dynamic scene configuration information.

REFERENCE SIGNS LIST

1 FILE GENERATION DEVICE
2 CLIENT DEVICE
3 VIEWPOINT INFORMATION INPUT DEVICE
10 FILE GENERATION UNIT
11 CONTROL UNIT
20 REPRODUCTION PROCESSING UNIT
21 CONTROL UNIT
100 DISTRIBUTION SYSTEM
101 DATA INPUT UNIT
102 PREPROCESSING UNIT
103 ENCODING UNIT
104 FILE GENERATION UNIT
105 TRANSMISSION UNIT
106 STORAGE UNIT
201 DISPLAY UNIT
202 DISPLAY CONTROL UNIT
203 DISPLAY INFORMATION GENERATION UNIT
204 DECODING PROCESSING UNIT
205 FILE PROCESSING UNIT
206 FILE ACQUISITION UNIT
207 MEASUREMENT UNIT

The invention claimed is:

1. An information processing apparatus comprising:
a preprocessing unit configured to generate, as scene configuration information indicating a configuration of a scene of 6DoF content configured by 3D model data, dynamic scene configuration information that changes over time and static scene configuration information that does not change over time, the static scene configuration information being scene configuration information different from the dynamic scene configuration information;
an encoding unit configured to generate the dynamic scene configuration information as a scene description that is arrangement information of data indicating the 3D model data; and
a file generation unit configured to include the static scene configuration information in control information of the 6DoF content,
wherein the preprocessing unit, the encoding unit, and the file generation unit are each implemented via at least one processor.

2. The information processing apparatus according to claim 1, wherein the 6DoF content further includes audio object data.

3. The information processing apparatus according to claim 1, wherein the encoding unit is further configured to individually generate a static scene description based on the static scene configuration information and a dynamic scene description based on the dynamic scene configuration information.

4. The information processing apparatus according to claim 3, wherein the file generation unit is further configured to separately store the static scene description and the dynamic scene description in different files having a format that specifies configuration information for each time of a plurality of times in the scene of 6DoF content.

5. The information processing apparatus according to claim 3, wherein the file generation unit is further configured to store the static scene description and the dynamic scene description in a same file having a format that specifies configuration information for each time of a plurality of times in the scene of 6DoF content, and include the static scene configuration information in management information in the file.

6. The information processing apparatus according to claim 3, wherein the file generation unit is further configured to, in a case where the static scene configuration information includes scene configuration information of a moving image, separately create a first file having a format that specifies configuration information for each time when the scene configuration information of the moving image is stored and a second file having the format that stores information other than the scene configuration information of the moving image.

7. The information processing apparatus according to claim 3, wherein the file generation unit is further configured to, in a case where the static scene configuration information includes scene configuration information of a moving image, store the scene configuration information of the moving image and the dynamic scene configuration information included in the static scene configuration information in a same file having a format that specifies configuration information for each time of a plurality of times in the scene of 6DoF content, and include the scene configuration information of the moving image included in the static scene configuration information in management information in the file.

8. The information processing apparatus according to claim 3, wherein
the preprocessing unit is further configured to generate scene configuration information of voice separately for the static scene configuration information and the dynamic scene configuration information, and
the file generation unit is further configured to include the static scene configuration information in the scene configuration information of the voice in management information in a file having a format that specifies configuration information for each time of a plurality of times in the scene of 6DoF content.

9. The information processing apparatus according to claim 1, wherein the file generation unit is further configured to include coordinate transformation information included in the static scene configuration information in the control information.

10. The information processing apparatus according to claim 1, wherein the file generation unit is further configured to store coordinate transformation information included in the static scene configuration information in a file having a format that specifies configuration information for each time of a plurality of times in the scene of 6DoF content.

11. The information processing apparatus according to claim 1, wherein the file generation unit is further configured to include coordinate transformation information included in the static scene configuration information in the control information, store the coordinate transformation information in a file having a format that specifies configuration information for each time of a plurality of times in the scene of 6DoF contents, and generate priority information of the coordinate transformation information included in the control information and the coordinate transformation information stored in the file.

12. The information processing apparatus according to claim 1, wherein the file generation unit is further configured to include, in the control information, information for identifying each of a voice scene and a moving image scene in the 6DoF content.

13. The information processing apparatus according to claim 1, wherein the file generation unit is further configured to include, in the control information, information for associating a voice scene and a moving image scene in the 6DoF content.

14. A reproduction processing apparatus comprising:
a display information generation unit configured to receive, as scene configuration information indicating a configuration of a scene of 6DoF content configured by 3D model data, dynamic scene configuration information that changes over time and static scene configuration information that does not change over time, the static scene configuration information being scene configuration information different from the dynamic scene configuration information, and generate display information for reproducing the scene based on the dynamic scene configuration information and the static scene configuration information,
wherein the dynamic scene configuration information is generated as a scene description that is arrangement information of data indicating the 3D model data,
wherein the static scene configuration information is included in control information of the 6DoF content, and
wherein the display information generation unit is implemented via at least one processor.

15. An information processing method comprising:
generating, as scene configuration information indicating a configuration of a scene of 6DoF content configured by 3D model data, dynamic scene configuration information that changes over time and static scene configuration information that does not change over time, the static scene configuration information being scene configuration information different from the dynamic scene configuration information;
generating the dynamic scene configuration information as a scene description that is arrangement information of data indicating the 3D model data; and
including the static scene configuration information in control information of the 6DoF content.

16. An information processing method comprising:
receiving, as scene configuration information indicating a configuration of a scene of 6DoF content configured by 3D model data, dynamic scene configuration information that changes over time and static scene configuration information that does not change over time, the static scene configuration information being scene configuration information different from the dynamic scene configuration information, and generating display information for reproducing the scene based on the dynamic scene configuration information and the static scene configuration information,
wherein the dynamic scene configuration information is generated as a scene description that is arrangement information of data indicating the 3D model data, and
wherein the static scene configuration information is included in control information of the 6DoF content.

* * * * *